(12) United States Patent
Yu et al.

(10) Patent No.: US 12,526,770 B2
(45) Date of Patent: Jan. 13, 2026

(54) COMMUNICATIONS METHOD AND APPARATUS

(71) Applicant: Huawei Technologies Co., Ltd., Shenzhen (CN)

(72) Inventors: Chang Yu, Shenzhen (CN); Junren Chang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 369 days.

(21) Appl. No.: 18/305,066

(22) Filed: Apr. 21, 2023

(65) Prior Publication Data
US 2023/0262656 A1   Aug. 17, 2023

Related U.S. Application Data

(63) Continuation of application No. PCT/CN2020/123422, filed on Oct. 23, 2020.

(51) Int. Cl.
*H04W 68/02* (2009.01)
*H04W 76/27* (2018.01)
*H04W 92/18* (2009.01)

(52) U.S. Cl.
CPC ........... *H04W 68/02* (2013.01); *H04W 76/27* (2018.02); *H04W 92/18* (2013.01)

(58) Field of Classification Search
CPC ..... H04W 76/27; H04W 76/14; H04W 68/02; H04W 92/18
See application file for complete search history.

(56) References Cited

U.S. PATENT DOCUMENTS

| | | | |
|---|---|---|---|
| 2021/0112524 A1* | 4/2021 | Yang | H04W 68/005 |
| 2022/0061021 A1* | 2/2022 | Wang | H04L 1/0061 |
| 2023/0224859 A1* | 7/2023 | Cheng | H04W 68/02 |
| | | | 455/458 |

FOREIGN PATENT DOCUMENTS

| | | | | |
|---|---|---|---|---|
| EP | 3499975 A1 | 6/2019 | | |
| EP | 4333519 A2 * | 3/2024 | ........ | H04W 52/0216 |
| WO | 2018195907 A1 | 11/2018 | | |

OTHER PUBLICATIONS

ZTE, Discussion on pairing and RRC state, Feb. 13-17, 2017, 3GPP TSG RAN WG2 #97, R2-1700781, pp. 1-4 (Year: 2017).*
Apple, "Discussion on Control Plane Mechanisms for Layer 2 Relay", R2-2007101, 3GPP TSG-RAN WG2 Meeting #111e, online, Aug. 17-28, 2020. XP052360219, total 4 pages.
ZTE, "Discussion on pairing and RRC state", 3GPP TSG RAN WG2 #97 R2-1700781, Athens, Greece, Feb. 13-17, 2017, total 4 pages.

* cited by examiner

*Primary Examiner* — Farid Seyedvosoghi
(74) *Attorney, Agent, or Firm* — Slater Matsil, LLP

(57) ABSTRACT

A communications method and apparatus. The method includes receiving first indication information, where the first indication information indicates the second terminal device to listen to a paging message for the first terminal device, and listening to the paging message sent by the network device for the first terminal device. The first terminal device communicates with the network device by using the second terminal device, and the first terminal device communicates with the second terminal device through a sidelink.

19 Claims, 8 Drawing Sheets

COMMUNICATIONS METHOD AND APPARATUS

CROSS-REFERENCE TO RELATED APPLICATIONS

This application is a continuation of International Application No. PCT/CN2020/123422, filed on Oct. 23, 2020, the disclosure of which is hereby incorporated by reference in its entirety.

TECHNICAL FIELD

This application relates to the communications field, and more specifically, to a communications method and apparatus.

BACKGROUND

With development of wireless multimedia services, people's requirements for high data rates and user experience are increasing, which imposes higher requirements on system capacity and coverage of conventional cellular networks. In addition, popularity of applications such as social networks, nearby data sharing, and local advertisements makes people have an increasing demand, that is, a proximity service, for understanding and communicating with people or things that they are interested in nearby. However, a conventional cell-based cellular network has obvious limitations in supporting a high data rate service and a proximity service. Based on this requirement, devices (for example, a terminal device and a terminal device) in a communications system can communicate with each other. The communication between the devices can reduce load of the cellular network, reduce battery power consumption of user equipment, increase a data rate, and improve robustness of a network infrastructure, so that requirements of the foregoing high data rate service and proximity service can be well met. The communication between the devices may be, for example, device-to-device (D2D) communication, or vehicle-to-everything (V2X) communication. The V2X communication may be, for example, vehicle to vehicle (\), vehicle to pedestrian (V2P), or vehicle to infrastructure. This is not limited.

The communication between the devices allows a plurality of user equipments to perform direct discovery/direct communication with or without the network infrastructure. In some scenarios, the user equipments each may include relay node UE (or relay UE). Remote UE at an edge of or outside cellular network coverage can perform cellular communication with a network by using the relay node UE, or the user equipments can communicate with each other by using the relay UE.

The remote UE may support three RRC statuses: an idle state, an inactive state, and a connected state. There are some possible scenarios in which the RRC status of the remote UE does not match (mismatch) the RRC status of the remote UE considered by the network device. For example, the network device considers that the remote UE is in the idle state or the inactive state, and the remote UE is currently in the connected state. In this case, how the network device, the remote UE, and the relay UE align the RRC statuses of the remote UE is an urgent problem to be resolved.

SUMMARY

This application provides a communications method and apparatus to help a network device, a first terminal device, and a second terminal device align RRC statuses of the first terminal device.

According to a first aspect, a communications method is provided. The method may be performed by a second terminal device or a component (for example, a chip or a circuit) that can be configured in the second terminal device. The method includes: receiving first indication information, where the first indication information indicates the second terminal device to listen to a paging message for a first terminal device; and listening to the paging message sent by a network device for the first terminal device.

The first terminal device communicates with the network device by using the second terminal device, and the first terminal device communicates with the second terminal device through a sidelink. For example, the first terminal device may be a remote terminal device, and the second terminal device may be a relay terminal device. This is not limited in this application.

Therefore, in this embodiment of this application, the second terminal device is indicated to listen to the paging message for the first terminal device, so that the second terminal device can determine an RRC status of the first terminal device to be an RRC idle state or an RRC inactive state, and determine to need to listen to the paging message for the first terminal device. This helps align RRC statuses of the first terminal device between the network device, the first terminal device, and the second terminal device. For example, the network device, the first terminal device, and the second terminal device all sense that the first terminal device is in the RRC idle state, the inactive state, or a connected state.

When the network device, the first terminal device, and the second terminal device align the RRC statuses of the first terminal device, data transmission can be performed more efficiently between the network device, the first terminal device, and the second terminal device. For example, the second terminal device can determine to listen to the paging message for the first terminal device or receive downlink data or signaling transmission, and implement receiving and forwarding of the paging message or data from the network device.

With reference to the first aspect, in some implementations of the first aspect, the method further includes sending second indication information to the first terminal device, where the second indication information indicates the first terminal device to enter the idle state or the inactive state.

Therefore, in this embodiment of this application, the second terminal device may further indicate the first terminal device to enter the RRC idle state or the RRC inactive state, so that the first terminal device enters the RRC idle state or the RRC inactive state. This helps align the RRC statuses of the first terminal device between the network device, the first terminal device, and the second terminal device.

In some possible implementations, the second terminal device may further send indication information to the first terminal device to further indicate whether the first terminal device enters the RRC idle state or the RRC inactive state. Optionally, the second terminal device may determine, based on an indication of the network device, whether the first terminal device enters the RRC idle state or the RRC inactive state. This is not limited in this application. The indication and the first indication information may be sent in a same message or different messages. This is not limited in this application.

With reference to the first aspect, in some implementations of the first aspect, the method further includes: sending third indication information to the first terminal device, where the third indication information indicates the first terminal device to release a sidelink configuration between the first terminal device and the second terminal device and/or an air-interface link configuration between the first terminal device and the network device. For example, the sidelink configuration may be a PC5 configuration. The PC5 configuration may include, for example, a sidelink radio bearer (SLRB) configuration, a MAC configuration, a radio link control (RLC) bearer configuration, an RLC configuration, and the like. The air-interface link configuration may be, for example, an NR air-interface data radio bearer (DRB) configuration, a signaling radio bearer, a PDCP configuration, an SDAP configuration, or the like.

Therefore, in this embodiment of this application, the first terminal device is indicated to release the sidelink configuration between the first terminal device and the second terminal device and/or the air-interface link configuration between the first terminal device and the network device, so that when entering the RRC idle state or the RRC inactive state, the first terminal device releases the sidelink configuration between the first terminal device and the second terminal device and/or the air-interface link configuration between the first terminal device and the network device.

With reference to the first aspect, in some implementations of the first aspect, the method further includes: determining that RRC statuses of the network device and the first terminal device are not aligned. In other words, when it is determined that the RRC statuses of the network device and the first terminal device are not aligned, the second terminal device may determine, based on the first indication information, to listen to the paging message for the first terminal device, that is, determine that the first terminal device is in the RRC idle state or the RRC inactive state.

For example, when it is determined that a first message from the network device fails to be received or the first message fails to be decoded, it is determined that the RRC statuses of the network device and the first terminal device are not aligned. The first message is used to release or suspend a radio resource control RRC connection between the first terminal device and the network device. For example, the first message may be an RRC connection release message or an RRC connection suspend message. This is not limited.

With reference to the first aspect, in some implementations of the first aspect, the first message is used to release the RRC connection between the first terminal device and the network device, and the first message indicates the first terminal device to enter the idle state; or the first message is used to suspend the RRC connection between the first terminal device and the network device, and the first message is used to configure the first terminal device to enter the inactive state.

With reference to the first aspect, in some implementations of the first aspect, the first indication information comes from the network device. Therefore, in this embodiment of this application, the network device may determine that the first terminal device enters the RRC idle state or the RRC inactive state. For example, when the network device does not need to send the downlink data or signaling to the first terminal device, the network device may determine that the first terminal device enters the RRC idle state or the RRC inactive state, and indicate the second terminal device to listen to the paging message for the first terminal device.

With reference to the first aspect, in some implementations of the first aspect, the first indication information is carried in an RRC message or a MAC CE sent by the network device to the second terminal device. In this way, the first indication information may be sent by using an existing message.

With reference to the first aspect, in some implementations of the first aspect, the first indication information comes from the first terminal device. Therefore, in this embodiment of this application, the first terminal device may determine to enter the RRC idle state or the RRC inactive state. For example, when the first terminal device does not need to send uplink data or signaling to the network device, the first terminal device may determine to enter the RRC idle state or the RRC inactive state, and indicate the second terminal device to listen to the paging message for the first terminal device.

With reference to the first aspect, in some implementations of the first aspect, the paging message is used by the network device to page the first terminal device. For example, the network device may send the paging message when the network device needs to send the downlink data or signaling to the first terminal device.

With reference to the first aspect, in some implementations of the first aspect, the first indication information includes an identifier of the first terminal device. In this case, the paging message sent by the network device for the first terminal device may be listened to based on the identifier of the first terminal device.

In this embodiment of this application, the first indication information includes the identifier of the first terminal device, so that when simultaneously communicating with a plurality of terminal devices through the sidelink, the second terminal device can listen to the paging message for the first terminal device based on the identifier of the first terminal device. Therefore, when simultaneously communicating with the plurality of terminal devices through the sidelink, the second terminal device can listen to a paging message for a first terminal device in the plurality of terminal devices or a paging message for each of the plurality of terminal devices.

With reference to the first aspect, in some implementations of the first aspect, the method further includes: receiving the paging message sent by the network device for the first terminal device; and sending the paging message to the first terminal device through the sidelink. Herein, the receiving the paging message sent by the network device for the first terminal device may be obtaining or listening to the paging message sent by the network device for the first terminal device. This is not limited.

Therefore, in this embodiment of this application, after aligning with the network device that the RRC status of the first terminal device is the RRC idle state or the RRC inactive state, the second terminal device may receive the paging message that is sent by the network device and that is used to page the first terminal device, and may send the paging message to the first terminal device. This helps the first terminal device determine, based on the paging message, to enter the RRC idle state or the RRC inactive state.

With reference to the first aspect, in some implementations of the first aspect, before the sending the paging message to the first terminal device through the sidelink, the sidelink may be further established or reestablished. For example, when the second terminal device has released or has not established the sidelink before sending the paging message through the sidelink, the second terminal device may establish or reestablish the sidelink to send the paging message.

According to a second aspect, a communications method is provided. The method may be performed by a first terminal device or a component (for example, a chip or a circuit) that can be configured in the first terminal device. The method includes: receiving second indication information from a second terminal device, and/or receiving a paging message forwarded by the second terminal device, where the second indication information indicates the first terminal device to enter an idle state or an inactive state, and the paging message is used by a network device to page the first terminal device; and entering the idle state or the inactive state.

The first terminal device communicates with the network device by using the second terminal device, and the first terminal device communicates with the second terminal device through a sidelink. For example, the first terminal device may be a remote terminal device, and the second terminal device may be a relay terminal device. This is not limited in this application.

Therefore, in this embodiment of this application, the second terminal device may indicate or forward, to the first terminal device, the paging message used to page the first terminal device, so that the first terminal device can enter the RRC idle state or the RRC inactive state based on the indication or the received paging message. This helps align RRC statuses of the first terminal device between the network device, the first terminal device, and the second terminal device.

In some possible implementations, the second terminal device may further send indication information to the first terminal device to further indicate whether the first terminal device enters the RRC idle state or the RRC inactive state. This is not limited in this application.

With reference to the second aspect, in some implementations of the second aspect, the method further includes: receiving third indication information from the second terminal device, where the third indication information indicates the first terminal device to release a sidelink configuration between the first terminal device and the second terminal device and/or an air-interface link configuration between the first terminal device and the network device. For example, the sidelink configuration may be a PC5 configuration. The PC5 configuration may include, for example, a sidelink radio bearer (SLRB) configuration, a MAC configuration, a radio link control (RLC) bearer configuration, an RLC configuration, and the like. The air-interface link configuration may be, for example, an NR air-interface configuration.

Therefore, in this embodiment of this application, the first terminal device is indicated, by the second terminal device, to release the sidelink configuration between the first terminal device and the second terminal device and/or the air-interface link configuration between the first terminal device and the network device, so that when entering the RRC idle state or the RRC inactive state, the first terminal device releases the sidelink configuration between the first terminal device and the second terminal device and/or the air-interface link configuration between the first terminal device and the network device.

With reference to the second aspect, in some implementations of the second aspect, before the receiving second indication information from a second terminal device, and/or receiving a paging message forwarded by the second terminal device, the sidelink may be further established or reestablished. For example, when the second terminal device has released or has not established the sidelink before sending the second indication information and/or the paging message through the sidelink, the second terminal device may establish or reestablish the sidelink to send the paging message.

With reference to the second aspect, in some implementations of the second aspect, when receiving the paging message that is forwarded by the second terminal device and that is from the network device, the entering the idle state or the inactive state may further include initiating an RRC establishment or resumption process with the network device.

In this way, the first terminal device may release a previous old air-interface link configuration by entering the RRC idle state or the RRC inactive state, and initiate the RRC establishment or resumption process with the network device based on the paging message to establish or resume the RRC connection, thereby reconfiguring an RRC link.

According to a third aspect, a communications method is provided. The method may be performed by a first terminal device or a component (for example, a chip or a circuit) that can be configured in the first terminal device. The method includes: determining that the first terminal device enters an idle state or an inactive state; and sending first indication information to a second terminal device, where the first indication information indicates the second terminal device to listen to a paging message for the first terminal device.

The first terminal device communicates with a network device by using the second terminal device, and the first terminal device communicates with the second terminal device through a sidelink. For example, the first terminal device may be a remote terminal device, and the second terminal device may be a relay terminal device. This is not limited in this application.

Therefore, in this embodiment of this application, the first terminal device may determine to enter an RRC idle state or an RRC inactive state, and when determining to enter the RRC idle state or the RRC inactive state, indicate the second terminal device to listen to the paging message for the first terminal device, that is, indicate, to the second terminal device, that an RRC status of the first terminal device is the RRC idle state or the RRC inactive state. This helps align RRC statuses of the first terminal device between the network device, the first terminal device, and the second terminal device.

With reference to the third aspect, in some implementations of the third aspect, when it is determined that no data or signaling of the first terminal device is received or sent within first duration, it may be determined to enter the idle state or the inactive state. For example, when it is determined that there is no UL data or signaling that needs to be sent to the network device within the first duration, and no DL data or signaling that is sent by the second terminal device and that is from the network device is received within the first duration, it is determined to enter the idle state or the inactive state.

In a possible implementation, the first terminal device side may set a timer to determine to enter the idle state or the inactive state if no data or signaling of the first terminal device is received or sent within the first duration. Optionally, the first terminal device may start or restart the timer when receiving or sending the data or signaling.

According to a fourth aspect, a communications method is provided. The method may be performed by a network device or a component (for example, a chip or a circuit) that can be configured in the network device. The method includes: sending a first message, where the first message is used to release or suspend a radio resource control RRC connection between a first terminal device and the network device; and sending first indication information to a second terminal device, where the first indication information indicates the second terminal device to listen to a paging message for the first terminal device.

The first terminal device communicates with the network device by using the second terminal device, and the first terminal device communicates with the second terminal device through a sidelink. For example, the first terminal device may be a remote terminal device, and the second terminal device may be a relay terminal device. This is not limited in this application.

Therefore, in this embodiment of this application, when releasing or suspending the RRC connection between the first terminal device and the network device, the network device may indicate the second terminal device to listen to the paging message for the first terminal device, so that the second terminal device can determine an RRC status of the first terminal device to be an RRC idle state or an RRC inactive state, and determine to need to listen to the paging message for the first terminal device. This helps align RRC statuses of the first terminal device between the network device, the first terminal device, and the second terminal device.

With reference to the fourth aspect, in some implementations of the fourth aspect, the first message may be sent to the second terminal device. When the first message is successfully sent to the second terminal device and successfully decoded by the second terminal device, the second terminal device can determine, based on the first message, that the RRC status of the first terminal device is the RRC idle state or the RRC inactive state.

With reference to the fourth aspect, in some implementations of the fourth aspect, the first message is not successfully sent to the second terminal device, or the first message is not successfully decoded by the second terminal device. In this case, because the second terminal device cannot read the RRC message sent by the network device for the first terminal device, the second terminal device cannot determine (that is, does not know) the RRC status of the first terminal device.

In a possible implementation, the network device may determine, based on whether a feedback message that is sent by the second terminal device and that corresponds to the first message is received, whether the first message is successfully sent to the second terminal device or whether the first message is successfully decoded by the second terminal device.

With reference to the fourth aspect, in some implementations of the fourth aspect, the method further includes: receiving negative feedback information. The negative feedback information indicates that the first message is not successfully sent to the second terminal device, or the first message is not successfully decoded by the second terminal device. In this way, the network device can determine, based on the negative feedback information, that the first message is not successfully sent to the second terminal device, or the first message is not successfully decoded by the second terminal device.

With reference to the fourth aspect, in some implementations of the fourth aspect, the paging message is used by the network device to page the first terminal device.

With reference to the fourth aspect, in some implementations of the fourth aspect, the first message is used to release the RRC connection between the first terminal device and the network device, and the first message is used to configure the first terminal device to enter the idle state.

For example, the first message may be an RRC connection release message. This is not limited in this application.

Alternatively, the first message is used to suspend the RRC connection between the first terminal device and the network device, and the first message is used to configure the first terminal device to enter the inactive state. For example, the first message may be an RRC connection suspend message. This is not limited in this application.

With reference to the fourth aspect, in some implementations of the fourth aspect, the first indication information includes an identifier of the first terminal device. The first indication information includes the identifier of the first terminal device, so that when simultaneously communicating with a plurality of terminal devices through the sidelink, the second terminal device can listen to the paging message for the first terminal device based on the identifier of the first terminal device.

With reference to the fourth aspect, in some implementations of the fourth aspect, before the sending first indication information to a second terminal device, a paging message or an RRC establishment message may be further sent to the second terminal device. Therefore, in this embodiment of this application, the second terminal device in the RRC idle state or the RRC inactive state may send the paging message or the RRC establishment message, so that the second terminal device may enter an RRC connected state from the RRC idle state or the RRC inactive state, and after entering the RRC connected state, receive a message or information sent by the network device, for example, the foregoing first message or first indication information.

With reference to the fourth aspect, in some implementations of the fourth aspect, the first indication information is carried in an RRC message or a media access control control element MAC CE.

According to a fifth aspect, a communications method is provided. The method may be performed by a second terminal device or a component (for example, a chip or a circuit) that can be configured in the second terminal device. The method includes as follows.

The second terminal device determines that no data or signaling of a first terminal device is received and/or sent within first duration; and determines that the first terminal device enters an idle state or an inactive state.

The first terminal device communicates with a network device by using the second terminal device, and the first terminal device communicates with the second terminal device through a sidelink. For example, the first terminal device may be a remote terminal device, and the second terminal device may be a relay terminal device. This is not limited in this application.

Therefore, in this embodiment of this application, the second terminal device may determine, by determining that no data or signaling of the first terminal device is received or sent within the first duration, that the first terminal device enters the idle state or the inactive state. This can help align RRC statuses of the first terminal device between the network device, the first terminal device, and the second terminal device.

For example, when determining that DL data or signaling that is delivered by the network device and that needs to be forwarded to the first terminal device is not received within the first duration, and when determining that UL data or signaling that is sent by the first terminal device and that needs to be forwarded to the network device is not received within the first duration, the second terminal device may determine that the first terminal device enters the idle state or the inactive state.

With reference to the fifth aspect, in some implementations of the fifth aspect, a paging message sent by the network device for the first terminal device may be further listened to. In this way, when determining that the first terminal device enters the RRC idle state or the RRC inactive state, the second terminal device may listen to the paging message sent by the network device for the first terminal device.

With reference to the fifth aspect, in some implementations of the fifth aspect, second indication information may be further sent to the network device, where the second indication information indicates the first terminal device to enter the idle state or the inactive state.

In this way, the second terminal device may indicate, to the network device, that the first terminal device enters the idle state or the inactive state. This helps align RRC statuses of the first terminal device between the network device, the first terminal device, and the second terminal device.

With reference to the fifth aspect, in some implementations of the fifth aspect, the method further includes: receiving the downlink data and/or signaling from the network device; and forwarding the downlink data and/or signaling to the first terminal device. The downlink data and/or signaling may trigger the first terminal device to initiate an RRC establishment or resumption process. Herein, the downlink data or signaling does not include an RRC release message.

With reference to the fifth aspect, in some implementations of the fifth aspect, the second terminal device may set a first timer, and when determining that the first timer expires, determine that no data or signaling of the first terminal device is received or sent within the first duration. For example, the timer may be a data inactivity timer. This is not limited in this application.

With reference to the fifth aspect, in some implementations of the fifth aspect, it may be set that the first timer expires when timing reaches the first duration, and when the data or signaling of the first terminal device is received or sent, the first timer is started or restarted.

With reference to the fifth aspect, in some implementations of the fifth aspect, the first duration is configured by the network device. For example, the second terminal device may receive indication information from the network device to determine the first duration, where the indication information indicates the first duration.

With reference to the fifth aspect, in some implementations of the fifth aspect, the second terminal device may further send fourth indication information to the first terminal device, where the fourth indication information indicates the first duration. For example, when the first duration is determined by the second terminal device or configured by the network device, the second terminal device may indicate the first duration to the first terminal device.

Therefore, in this embodiment of this application, the network device indicates the first duration to the second terminal device, and/or the second terminal device indicates the first duration to the first terminal device, so that the first duration can be aligned. This helps align the RRC statuses of the first terminal device between the network device, the first terminal device, and the second terminal device.

In some possible implementations, the first duration may be determined by the second terminal device, or may be predefined in a protocol. This is not limited in this application.

In some possible implementations, the first duration may be configured by the first terminal device. For example, the second terminal device may receive indication information from the first terminal device to determine the first duration.

Optionally, when the first duration is determined by the second terminal device or configured by the first terminal device, the second terminal device may further indicate the first duration to the network device.

According to a sixth aspect, a communications method is provided. The method may be performed by a first terminal device or a component (for example, a chip or a circuit) that can be configured in the first terminal device. The method includes as follows.

The first terminal device determines that no data or signaling is received from a network device within first duration, and/or no data or signaling is sent to the network device; and determines that the first terminal device enters an idle state or an inactive state.

The first terminal device communicates with the network device by using a second terminal device, and the first terminal device communicates with the second terminal device through a sidelink. For example, the first terminal device may be a remote terminal device, and the second terminal device may be a relay terminal device. This is not limited in this application.

Therefore, in this embodiment of this application, the first terminal device may determine, by determining that no data or signaling of the first terminal device is received or sent within the first duration, that the first terminal device enters the idle state or the inactive state. This can help align RRC statuses of the first terminal device between the network device, the first terminal device, and the second terminal device.

For example, when determining that there is no UL data or signaling that needs to be sent to the network device within the first duration, and no DL data or signaling that is sent by the second terminal device and that is from the network device is received within the first duration, the first terminal device may determine to enter the idle state or the inactive state.

With reference to the sixth aspect, in some implementations of the sixth aspect, the method further includes: sending second indication information to the second terminal device or the network device, where the second indication information indicates that the first terminal device is in the idle state or the inactive state.

In this way, the first terminal device may indicate, to the second terminal device or the network device, that the first terminal device enters the idle state or the inactive state. This helps align the RRC statuses of the first terminal device between the network device, the first terminal device, and the second terminal device.

With reference to the sixth aspect, in some implementations of the sixth aspect, the method further includes: receiving the downlink data and/or signaling that are/is forwarded by the second terminal device and that are/is from the network device; and initiating an RRC establishment or resumption process with the network device.

Herein, the downlink data or signaling does not include an RRC release message. Therefore, in this embodiment of this application, when the first terminal device is in the RRC idle state or the RRC inactive state, if receiving the downlink data and/or signaling that are/is forwarded by the second terminal device and that are/is from the network device, the first terminal device may initiate the RRC establishment or resumption process with the network device to receive the downlink data and/or signaling.

With reference to the sixth aspect, in some implementations of the sixth aspect, the first terminal device may set a second timer, and when determining that the second timer expires, determine that no data or signaling from the network device is received within the first duration, and/or no data or signaling is sent to the network device. For example, the timer may be a data inactivity timer. This is not limited in this application.

With reference to the sixth aspect, in some implementations of the sixth aspect, the second timer may be set to expire when timing reaches the first duration, and when the data or signaling from the network device is received, and/or the data or signaling is sent to the network device, the second timer may be started or restarted.

With reference to the sixth aspect, in some implementations of the sixth aspect, the method further includes: receiving fourth indication information from the second terminal device, where the fourth indication information indicates the first duration. Therefore, in this embodiment of this application, the second terminal device indicates the first duration to the first terminal device, so that the first duration can be aligned. This helps align the RRC statuses of the first terminal device between the network device, the first terminal device, and the second terminal device.

In some possible implementations, the first duration may be determined by the first terminal device, or may be predefined in a protocol. This is not limited in this application.

In some possible implementations, the first duration may be configured by the network device. For example, the first terminal device may receive indication information from the network device to determine the first duration.

Optionally, when the first duration is determined by the first terminal device or configured by the second terminal device, the first terminal device may further indicate the first duration to the network device.

According to a seventh aspect, a communications method is provided. The method may be performed by a network device or a component (for example, a chip or a circuit) that can be configured in the network device. The method includes as follows.

The network device determines that no data or signaling of a first terminal device is received and/or sent within first duration; and determines that the first terminal device enters an idle state or an inactive state.

The first terminal device communicates with the network device by using a second terminal device, and the first terminal device communicates with the second terminal device through a sidelink. For example, the first terminal device may be a remote terminal device, and the second terminal device may be a relay terminal device. This is not limited in this application.

Therefore, in this embodiment of this application, the network device may determine, by determining that no data or signaling of the first terminal device is received or sent within the first duration, that the first terminal device enters the idle state or the inactive state. This can help align RRC statuses of the first terminal device between the network device, the first terminal device, and the second terminal device.

For example, when determining that there is no DL data or signaling that needs to be sent to the first terminal device within the first duration, and no UL data or signaling from the first terminal device is received within the first duration, the network device may determine that the first terminal device enters the idle state or the inactive state.

With reference to the seventh aspect, in some implementations of the seventh aspect, the method further includes: sending first indication information to the second terminal device, where the first indication information indicates the second terminal device to listen to a paging message for the first terminal device.

Therefore, in this embodiment of this application, when determining that the first terminal device enters the RRC idle state or the RRC inactive state, the network device may indicate the second terminal device to listen to the paging message for the first terminal device, so that the second terminal device can determine that the paging message needs to be listened to for the first terminal device. This helps align the RRC statuses of the first terminal device between the network device, the first terminal device, and the second terminal device.

With reference to the seventh aspect, in some implementations of the seventh aspect, the method further includes: sending second indication information to the second terminal device, where the second indication information indicates the first terminal device to enter the idle state or the inactive state.

Therefore, in this embodiment of this application, when determining that the first terminal device enters the RRC idle state or the RRC inactive state, the network device may indicate the second terminal device to listen to that the first terminal device enters the RRC idle state or the RRC inactive state. In this way, the second terminal device can determine that the RRC status of the first terminal device is the RRC idle state or the RRC inactive state. This can help align the RRC statuses of the first terminal device between the network device, the first terminal device, and the second terminal device.

With reference to the seventh aspect, in some implementations of the seventh aspect, the network device may set a third timer, and when determining that the third timer expires, determine that no data or signaling of the first terminal device is received or sent within the first duration.

With reference to the seventh aspect, in some implementations of the seventh aspect, the third timer may be set to expire when timing reaches the first duration, and the third timer may be started or restarted at a moment of receiving or sending the data or signaling of the first terminal device.

With reference to the seventh aspect, in some implementations of the seventh aspect, the network device may further determine the first duration.

With reference to the seventh aspect, in some implementations of the seventh aspect, the network device may further send fourth indication information to the second terminal device, where the fourth indication information indicates the first duration.

Therefore, in this embodiment of this application, the network device indicates the first duration to the second terminal device, so that the first duration can be aligned. This helps align the RRC statuses of the first terminal device between the network device, the first terminal device, and the second terminal device.

In some possible implementations, the network device may receive indication information from the first terminal device or the second terminal device to determine the first duration. This is not limited in this application.

According to an eighth aspect, a communications method is provided. The method may be performed by a second terminal device or a component (for example, a chip or a circuit) that can be configured in the second terminal device. The method includes as follows.

The second terminal device receives second indication information, where the second indication information indicates that a first terminal device is in an idle state or an inactive state; and determines, based on the second indication information, that the first terminal device is in the idle state or the inactive state.

The first terminal device communicates with a network device by using the second terminal device, and the first terminal device communicates with the second terminal device through a sidelink. For example, the first terminal device may be a remote terminal device, and the second terminal device may be a relay terminal device. This is not limited in this application.

Therefore, in this embodiment of this application, it is indicated to the second terminal device that an RRC status of the first terminal device is the RRC idle state or the RRC inactive state. This helps align RRC statuses of the first terminal device between the network device, the first terminal device, and the second terminal device.

With reference to the eighth aspect, in some implementations of the eighth aspect, the second indication information comes from the first terminal device.

With reference to the eighth aspect, in some implementations of the eighth aspect, the second indication information may be further sent to the network device.

With reference to the eighth aspect, in some implementations of the eighth aspect, the second indication information comes from the network device.

According to a ninth aspect, a communications method is provided. The method may be performed by a network device or a component (for example, a chip or a circuit) that can be configured in the network device. The method includes as follows.

The network device receives second indication information, where the second indication information indicates that a first terminal device is in an idle state or an inactive state; and determines, based on the second indication information, that the first terminal device is in the idle state or the inactive state.

The first terminal device communicates with the network device by using a second terminal device, and the first terminal device communicates with the second terminal device through a sidelink. For example, the first terminal device may be a remote terminal device, and the second terminal device may be a relay terminal device. This is not limited in this application.

Therefore, in this embodiment of this application, it is indicated to the network device that an RRC status of the first terminal device is the RRC idle state or the RRC inactive state. This helps align RRC statuses of the first terminal device between the network device, the first terminal device, and the second terminal device.

With reference to the ninth aspect, in some implementations of the ninth aspect, the second indication information comes from the first terminal device or the second terminal device.

According to a tenth aspect, a communications method is provided. The method may be performed by a first terminal device or a component (for example, a chip or a circuit) that can be configured in the first terminal device. The method includes as follows.

The first terminal device receives second indication information, where the second indication information indicates that the first terminal device is in an idle state or an inactive state; and enters the idle state or the inactive state.

The first terminal device communicates with a network device by using a second terminal device, and the first terminal device communicates with the second terminal device through a sidelink. For example, the first terminal device may be a remote terminal device, and the second terminal device may be a relay terminal device. This is not limited in this application.

Therefore, in this embodiment of this application, it is indicated to the first terminal device that an RRC status of the first terminal device is the RRC idle state or the RRC inactive state. This helps align RRC statuses of the first terminal device between the network device, the first terminal device, and the second terminal device.

With reference to the tenth aspect, in some implementations of the tenth aspect, the second indication information comes from the second terminal device or the network device.

According to an eleventh aspect, a communications apparatus is provided, configured to perform the method according to any one of the first aspect to the tenth aspect or the possible implementations of the first aspect to the tenth aspect. Specifically, the apparatus includes units or modules configured to perform the method according to any one of the first aspect to the tenth aspect or the possible implementations of the first aspect to the tenth aspect.

According to a twelfth aspect, a communications apparatus is provided, including a processor and a transceiver. Optionally, the apparatus may further include a memory. The memory is configured to store instructions. The processor is configured to execute the instructions stored in the memory. When the processor executes the instructions stored in the memory, the execution enables the processor to perform the method according to any one of the first aspect to the tenth aspect or the possible implementations of the first aspect to the tenth aspect.

According to a thirteenth aspect, a communications chip is provided, including a processor and a communications interface. The processor is configured to: invoke instructions from the communications interface, and run the instructions. When executing the instructions, the processor implements the method according to any one of the first aspect to the tenth aspect or the possible implementations of the first aspect to the tenth aspect.

Optionally, the communications chip may further include a memory. The memory stores instructions, and the processor is configured to execute the instructions stored in the memory or other instructions. When the instructions are executed, the processor is configured to implement the method according to any one of the first aspect to the tenth aspect or the possible implementations of the first aspect to the tenth aspect.

According to a fourteenth aspect, a computer-readable medium is provided, configured to store a computer program. The computer program includes instructions used to perform the method according to any one of the first aspect to the tenth aspect or the possible implementations of the first aspect to the tenth aspect.

According to a fifteenth aspect, an embodiment of this application further provides a computer program product including instructions. When the computer program product runs on a computer, the computer is enabled to perform the method according to any one of the first aspect to the tenth aspect or the possible implementations of the first aspect to the tenth aspect.

According to a sixteenth aspect, a communications system is provided. The communications system includes a network device, a first terminal device, and a second terminal device. For the network device, the first terminal device, and the second terminal device, refer to the description of the first aspect to the tenth aspect.

It should be understood that for beneficial effects achieved in the eleventh aspect to the sixteenth aspect and the corresponding implementations of this application, refer to beneficial effects achieved in the first aspect to the tenth aspect and the corresponding implementations of this application. Details are not described again.

DETAILED DESCRIPTION OF ILLUSTRATIVE EMBODIMENTS

Figure 1:
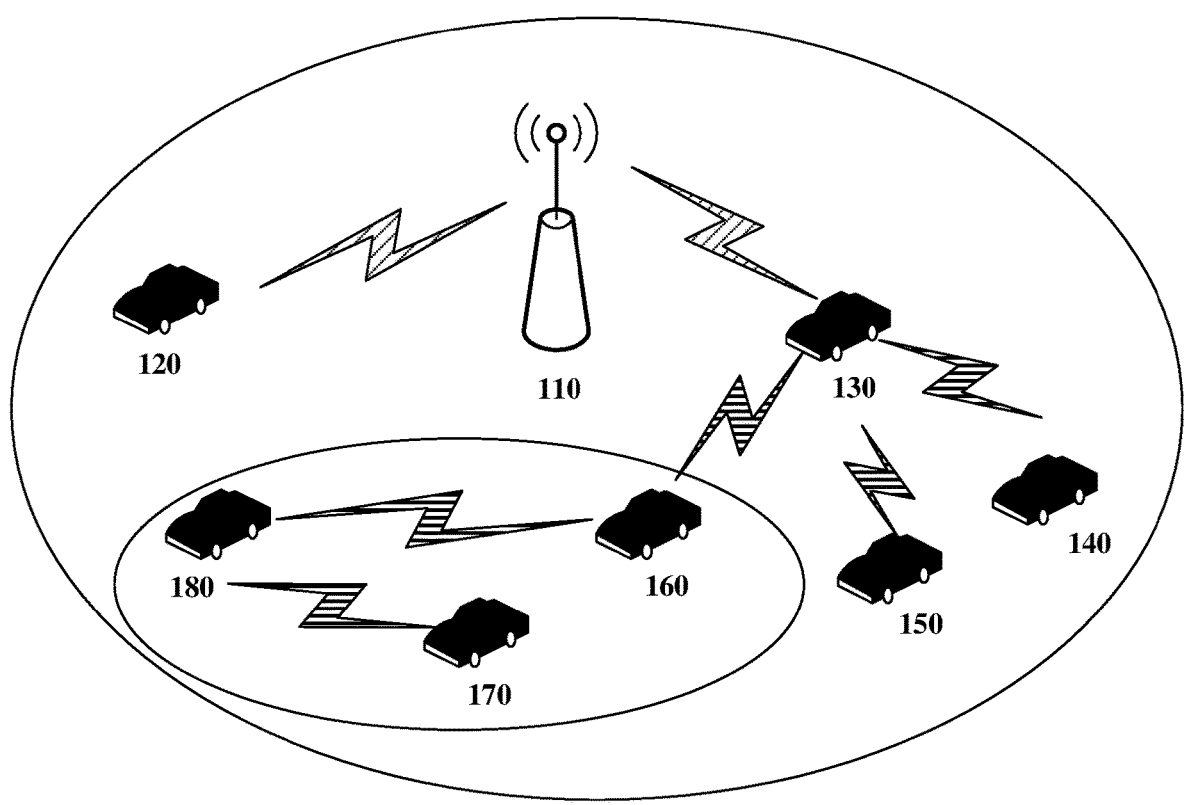
FIG. 1 is a schematic diagram of a communications system applicable to this application.

The following describes technical solutions of this application with reference to accompanying drawings.

The technical solutions of embodiments of this application may be applied to various communications systems, such as a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a 5th generation (5G) system, or a new radio (NR) system.

Generally, a conventional communications system supports a limited quantity of connections and is easy to implement. However, with development of communications technologies, a mobile communications system not only supports conventional communication, but also supports, for example, Internet of things (IoT) communication, device-to-device (D2D) communication, machine to machine (M2M) communication, machine type communication (MTC), vehicle-to-everything (V2X) communication, vehicle-to-vehicle (V2V) communication, vehicle-to-pedestrian (V2P) communication, vehicle-to-infrastructure communication, and the like. This is not limited.

The terminal device mentioned in embodiments of this application may be a device that provides a user with voice and/or data connectivity, a handheld device with a radio connection function, another processing device connected to a wireless modem, a vehicle-mounted device, or the like. A wireless terminal may communicate with one or more core networks by using a radio access network (RAN), or may support direct communication between terminal devices. Currently, some examples of the terminal are a mobile phone, a tablet computer, a laptop computer, a palmtop computer, a mobile Internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, a cellular phone, a cordless telephone set, a session initiation protocol (SIP) phone, a wireless local loop (WLL) station, a personal digital assistant (PDA), a handheld device having a wireless communications function, a computing device or another processing device connected to a wireless modem, a vehicle-mounted device, a wearable device, a terminal device in a future 5G network, a terminal device in a future evolved public land mobile network (PLMN), or the like. This is not limited in embodiments of this application.

By way of example and not limitation, in embodiments of this application, the terminal device may alternatively be a wearable device. The wearable device may also be referred to as a wearable intelligent device, and is a general term of a wearable device that is intelligently designed and developed for daily wear by using a wearable technology, for example, glasses, gloves, a watch, clothing, and shoes. The wearable device is a portable device that can be directly worn on a body or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on smartphones, such as smart watches or smart glasses, and devices that focus on only one type of application function and that need to work with other devices such as smartphones, for example, various smart bands or smart jewelry for monitoring physical signs.

In addition, in embodiments of this application, the terminal device may alternatively be a terminal device in an Internet of things (IoT) system. IoT is an important part of future development of information technologies. A main technical feature of the IoT is connecting things to a network by using a communications technology to implement an intelligent network for human-machine interconnection and thing-thing interconnection.

A network device in embodiments of this application may be any apparatus deployed in a radio access network to provide a wireless communications function for a terminal device. The network device may include macro base stations, micro base stations (also referred to as small cells), relay stations, and access points in various forms. In systems using different radio access technologies, names of the network device may vary, for example, a base transceiver station (BTS) in a global system for mobile communications (GSM) or a code division multiple access (CDMA) network, an NB (NodeB) in wideband code division multiple access (WCDMA), or an eNB or an eNodeB (Evolved NodeB) in long term evolution (LTE). Alternatively, the network device may be a radio controller in a cloud radio access network (CRAN) scenario. Alternatively, the network device may be a base station gNB device in a 5G network or a network device in a future evolved PLMN network. Alternatively, the network device may be a wearable device or a vehicle-mounted device. Alternatively, the network device may be a transmission and reception point (TRP).

The following first describes an application scenario of this application. FIG. 1 is a schematic diagram of a communications system applicable to this application. For example, the communications system may be a V2X communications system. However, this application is not limited thereto. As shown in FIG. 1, the communications system may include a network device 110, a terminal device 120, a terminal device 130, a terminal device 140, a terminal device 150, a terminal device 160, a terminal device 170, and a terminal device 180. The terminal devices may be, for example, vehicles, and may communicate with the network device 110 by using a radio link. For example, the terminal device may communicate with the network device 110 by using an electromagnetic wave.

In FIG. 1, the network device 110 may perform signaling and/or data transmission with one or more of the foregoing seven terminal devices. For example, the terminal device 120 or the terminal device 130 may send uplink data and/or signaling to the network device 110, and the network device 110 may receive the uplink data/or signaling sent by the terminal device 120 or the terminal device 130. For another example, the network device 110 may further send downlink data and/or signaling to the terminal device 120, the terminal device 180, and the terminal device 130. The terminal device 130 may further send the downlink data and/or signaling to the terminal device 140, the terminal device 150, and the terminal device 160, or the terminal device 130 may send data and/or signaling to the terminal device 140, the terminal device 150, and the terminal device 160 on a sidelink. In addition, the terminal device 160, the terminal device 170, and the terminal device 180 may alternatively form a communications system. The terminal device 180 may send data and/or signaling to the terminal device 160 and the terminal device 170 on a sidelink. In other words, the communications system to which this embodiment of this application is applied not only includes communication between a terminal device and a network device, but also may include communication between terminal devices.

It should be noted that a plurality of terminal devices shown in embodiments of this application are intended to better and more comprehensively describe embodiments of this application, but should not constitute any limitation on embodiments of this application. For example, in actual application, there may be only one or more foregoing terminal devices.

It should be understood that the communications system 100 is merely an example for description, and a communications system applicable to this application is not limited thereto. For example, a quantity of network devices and terminal devices included in the communications system 100 may alternatively be another quantity, or the terminal device may alternatively be another type of terminal device.

In FIG. 1, the terminal device 130 and the terminal device 180 may be used as relay terminal devices (that is, relay nodes). The terminal device 140, the terminal device 150, the terminal device 160, and the terminal device 170 may be used as remote terminal devices (that is, remote nodes). The remote terminal device can communicate with the network device by using the relay terminal device, or remote devices can communicate with each other by using the relay terminal device.

Figure 2:
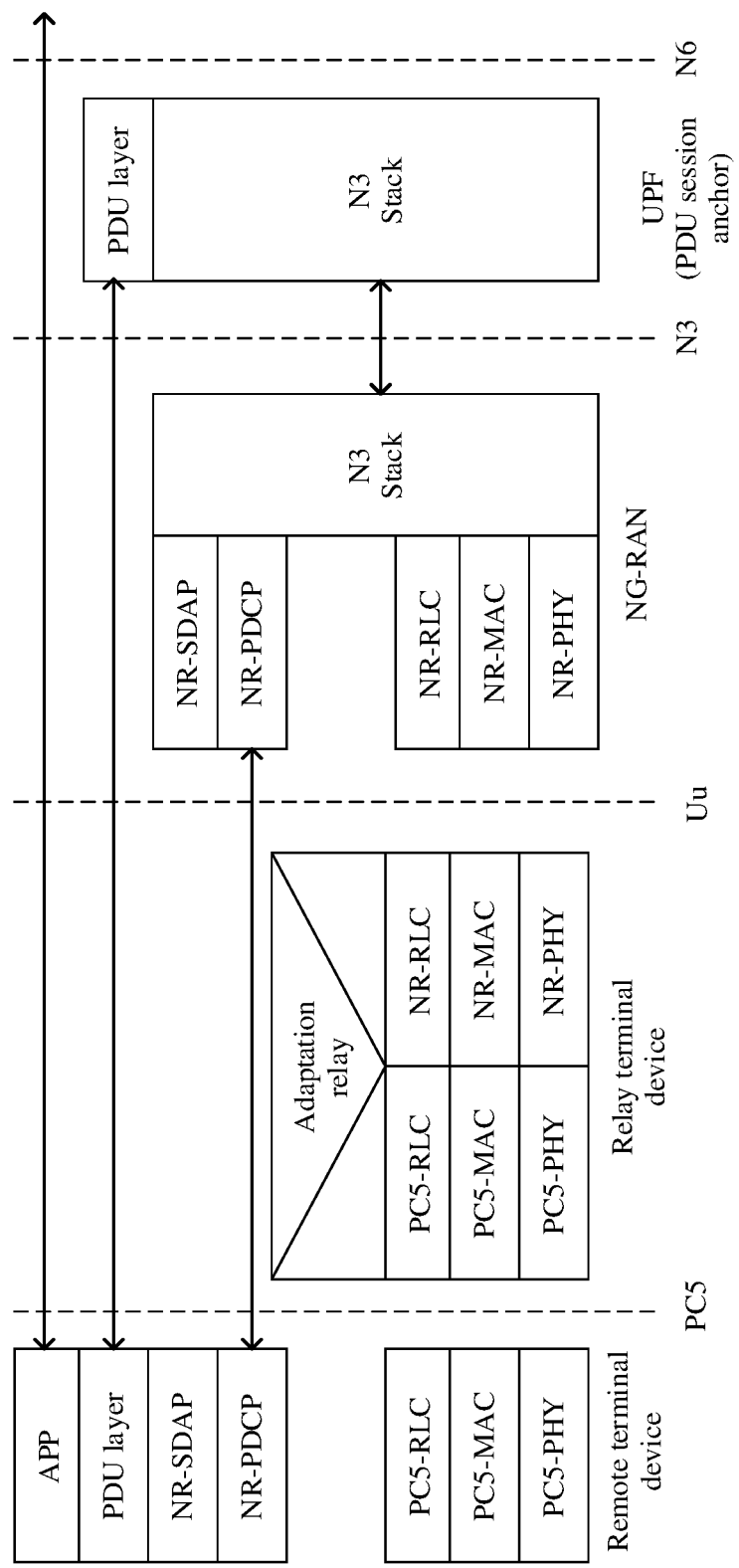
FIG. 2 is a schematic diagram of a protocol stack of a U2N relay.

FIG. 2 is a schematic diagram of a UE-to-network (U2N) protocol stack. As shown in FIG. 2, the remote terminal device has two protocol stack structures: an NR protocol stack structure and a PC5 protocol stack structure. The NR protocol stack includes an application (APP) layer, a protocol data unit (PDU) layer, and an NR-service data adaptation protocol (SDAP) layer, an NR-packet data convergence protocol (PDCP) layer, and the like. The PC5 protocol stack includes a PC5-radio link control (RLC) layer, a PC5-media access control (MAC) layer, and a PC5-physical (PHY) layer. The relay terminal device also has two protocol stack structures: an NR protocol stack structure and a PC5 protocol stack structure. The NR protocol stack includes an NR-RLC layer, an NR-MAC layer, and an NR-PHY layer. An NG-RAN (also referred to as a 5G-RAN) includes an NR protocol stack structure and an N3 stack. The NR protocol stack structure includes an NR-SDAP layer, an NR-PDCP layer, an NR-RLC layer, an NR-MAC layer, and an NR-PHY layer. A UPF is, for example, a PDU session anchor, and may include a PDU layer and an N3 stack.

In FIG. 2, the NR protocol stack structure of the remote terminal device may communicate with the NG-RAN, the UPF, or another network side device, and the PC5 protocol stack may communicate with the PC5 protocol stack in the relay terminal device. The NR protocol stack in the relay terminal device may communicate with the NR structure stack in the NG-RAN.

It should be noted that, in FIG. 2, an example in which the NR protocol stack is an uplink and downlink protocol stack is used for description, and an example in which the PC5 protocol stack is a sidelink (SL) between terminal devices is used for description. However, this embodiment of this application is not limited thereto.

The following describes RRC connection statuses in this application.

There are three RRC connection statuses: an RRC idle state, an RRC connected state, and an RRC inactive state.

When a terminal device is in the RRC idle state, usually, the terminal device cannot transmit data to a network device, and the terminal device and the network device do not store a context of the terminal device. However, a core network device stores the context of the terminal device. In addition, there is no dedicated signaling connection of the terminal device between the core network device and the network device. In this case, the terminal device may implement mobility processing through cell selection or reselection. For example, the terminal device in the RRC idle state may perform the following behavior: listening to an SMS message (short message) that is transmitted by using downlink control information (DCI) and that is scrambled by using a paging radio network temporary identifier (paging radio network temporary identifier, P-RNTI); listening to a paging channel used by the core network (core network, CN) for paging, for example, listening to the paging channel by using an S-temporary mobile subscriber identity (S-TMSI) allocated by the core network device to the terminal device; measuring a neighboring cell, and selecting or reselecting a cell; and obtaining system information, and sending a system information (SI) request (if configured).

When a terminal device is in the RRC connected state, both a core network device and an access device have a context of the terminal device, an RRC connection is maintained between the terminal device and the access device, and the terminal device may perform uplink and downlink data transmission. For example, the terminal device in the RRC connected state may perform the following behavior: listening to a SMS message (if configured) that is transmitted by using DCI and that is scrambled by using a P-RNTI; listening to a control channel associated with a shared data channel to determine whether the network device schedules data for the control channel; providing channel quality and feedback information; measuring a neighboring cell, and reporting a measurement; and obtaining system information.

When a terminal device is in the RRC inactive state, the terminal device and an access device store an AS context of the terminal device, and a core network device also has the context of the terminal device. In addition, there is a signaling connection dedicated to the terminal device between the core network device and the access device, and the terminal device and the access device do not need to maintain an RRC connection. This reduces signaling overheads and power consumption of the terminal device. Therefore, when the terminal device hands over from the RRC inactive state to the RRC connected state, the core network device does not need to participate, and data transmission can be quickly performed. In this case, the terminal device may implement mobility processing through cell reselection. For example, the terminal device in the RRC inactive state may perform the following behavior: listening to a SMS message that is transmitted by using DCI and that is scrambled by using a P-RNTI; listening to a paging channel used by the CN for paging, for example, listening to the paging channel by using an S-TMSI allocated by the core network device to the terminal device; listening to a paging channel used by an for RAN paging, for example, listening to the paging channel by using an RNTI; measuring a neighboring cell, and selecting or reselecting a cell; performing RNA-based notification area update periodically or when moving outside a configured RAN-based notification area; and obtaining system information and sending an SI request (if configured).

It can be learned that, for the core network device, the terminal device in the inactive state is similar to the terminal device in the connected state. For the access device, the terminal device in the inactive state is similar to the terminal device in the idle state, there is no real-time RRC connection or data sending, and downlink data needs to be sent to the terminal device through paging. For the inactive state, because the dedicated connection between the core network device and the access device is not released, the access device side stores the context of the terminal device, so that a speed of restoring the terminal device to the connected state can be increased, and data transmission can be quickly performed.

Figure 3:
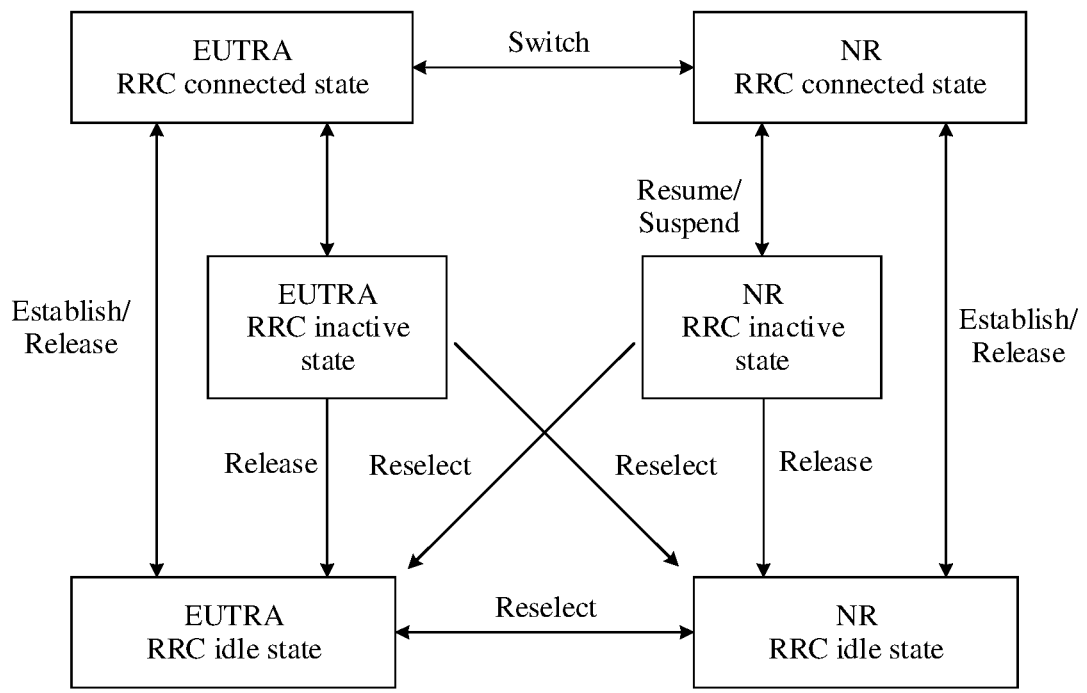
FIG. 3 is a schematic diagram of handing over RRC connection statuses of a terminal device.

FIG. 3 shows an example of handing over RRC connection statuses of a terminal device in an LTE communications system and an NR communications system. The RRC connection statuses in the LTE communications system may include, for example, an evolved UMTS terrestrial radio access (EUTRA) RRC connected state, an EUTRA RRC inactive state, and an EUTRA RRC idle state. The RRC connection statuses in the NR communications system may include, for example, an NR RRC connected state, an NR RRC inactive state, and an NR RRC idle state.

As shown in FIG. 3, in the LTE or NR communications system, the terminal device may switch between the RRC connected state and the RRC inactive state. For example, the terminal device suspends (suspend, which may also be referred to as release with suspend) in the RRC connected state to enter the inactive state, and may resume in the inactive state to enter the connected state. Alternatively, the terminal device may switch between the RRC connected state and the RRC idle state. For example, the terminal device may release in the RRC connected state to enter the RRC idle state, or may perform RRC establishment in the RRC idle state to enter the RRC connected state. The terminal device may further release in the inactive state to enter the idle state.

In addition, the terminal device may further switch (hand over) between the EUTRA RRC connected state and the NR connected state, switch between the EUTRA RRC idle state and the NR RRC idle state through reselection, enter the NR RRC idle state from the EUTRA RRC inactive state through reselection, or enter the EUTRA RRC idle state from the NR RRC inactive state through reselection.

When the network device has to-be-sent downlink data, but the terminal device is in the RRC idle state or the RRC inactive state, the network device initiates paging. Alternatively, when system information is updated, the network device notifies, through paging, the terminal device that the system information is updated.

In other words, paging allows the network device to reach the terminal device in the RRC idle state and the RRC inactive state by using a paging message, or notify, by using a SMS message, the terminal device in the RRC idle state, the RRC inactive state, and the RRC connected state of a system message (system information) change and an earthquake and tsunami warning system (ETWS) or commercial mobile alert system (CMAS) instruction. Both the paging message and the SMS message are addressed on a physical downlink control channel (PDCCH) by using a P-RNTI. The paging message is sent on a paging control channel (PCCH), and the SMS message is directly sent on the PDCCH. The paging message is sent to the terminal device by using a physical downlink shared channel (PDSCH) resource location indicated by the PDCCH scrambled by using the P-RNTI.

On the terminal device side, when the terminal device is in the RRC idle state, the terminal device may listen to a paging channel to receive the paging message initiated by the CN. When the terminal device is in the RRC inactive state, the terminal device may listen to the paging channel to receive a paging message initiated by a RAN. The terminal device may not need to continuously listen to the paging channel. For example, in a defined paging discontinuous reception (DRX) cycle, the terminal device in the RRC idle state or the inactive state needs to listen to the paging channel on only one paging occasion (PO) in each DRX cycle. In this way, the terminal device may wake up in a predetermined time period to receive the paging message, and maintain a sleep state in another time period. In this way, power consumption can be reduced, and a lifespan of a battery of the terminal device can be prolonged.

For example, the terminal device may attempt to receive the paging message in a specific PO of a paging frame (PF) in a paging cycle. One PO may include a plurality of slots, and the PO is not necessarily a subframe. Correspondingly, the network device needs to send the paging message through an air interface at a corresponding moment. In this way, the terminal device can receive the paging message at this moment.

In conclusion, the terminal device in the RRC idle state or the RRC inactive state may receive the paging message, and the terminal device in the RRC connected state, the RRC idle state, or the RRC inactive state can receive a paging system message update indication and another paging notification message.

The terminal device in the RRC idle state receives paging initiated by the CN (CN-initiated), and the terminal device in the RRC inactive state receives paging initiated by the RAN (RAN-initiated). In the two cases, formats of paging messages may be the same.

When the terminal device is in the RRC idle state, if an identifier of the terminal device matches one of terminal device identifiers (for example, a UE identifier or a UE identity) in a paging list, the terminal device reports the terminal device identifier of the terminal device to a higher layer of the terminal device.

When the terminal device is in the RRC inactive state, if an inactive RNTI (I-RNTI) of the terminal device matches one of terminal device identifiers (for example, a UE identifier or a UE identity) in a paging list, an RRC connection process is initialized. The I-RNTI is carried in the UE identity in the paging message, and is used to wake up the terminal device in the inactive state. Otherwise, if the inactive RNTI is an identifier corresponding to the terminal device, the terminal device reports the terminal device identifier to a higher layer of the terminal device, and the terminal device enters the RRC idle state.

After receiving the paging system message update indication, the terminal device may receive a new system message in a next modification cycle.

In a U2N relay scenario, for example, in the scenario shown in FIG. 1, if remote UE is in the RRC idle state or the inactive state, the remote UE may listen to a paging message through a Uu interface between the remote UE and the network device (this is applicable only to remote UE in coverage (IC)), or relay UE may replace the remote UE to listen to the paging message of the remote UE. The two manners of listening to the paging message may be configured by the network device. This is not limited in this embodiment of this application.

When the relay UE replaces the remote UE to listen to the paging message of the remote UE, the relay UE needs to know that the remote UE enters the idle state or the inactive state. In this case, the relay UE may listen to the paging message on a PO of the remote UE, or may listen to the paging message on a PO of the relay UE. This is not limited.

In a possible case, when determining that the remote UE enters the idle state, the network device sends, to the relay UE, an RRC connection release message that needs to be sent to the remote UE. The relay UE may not receive or cannot successfully decode the RRC connection release message sent by the network device to the remote UE. In this case, the relay UE does not forward, to the remote UE, the RRC connection release message sent by the network device to the remote UE. Therefore, the remote UE cannot receive the RRC connection release message delivered by the network device, and still remains in the connected state. In this case, a problem that RRC statuses of the network device, the relay UE, and the remote UE mismatch occurs.

This leads to the following problems.

When the network device configures the remote UE to listen to the PO, the remote UE does not listen to the paging message because the remote UE does not match the RRC status of the network device; and when the network device configures the relay UE to replace the remote UE to listen to the paging message of the remote UE, because the relay UE does not know that the network device considers that the remote UE is in the idle state, the relay UE does not know that the relay UE needs to listen to the paging message for the remote UE.

In view of this, an embodiment of this application provides a communications method. In the method, relay UE may be indicated to listen to a paging message of remote UE, so that the relay UE can determine that an RRC status of the remote UE is an RRC idle state or an RRC inactive state. Further, the relay UE may indicate the remote UE to enter the RRC idle state or the RRC inactive state, so that RRC statuses of the remote UE are aligned between the network device, the relay UE, and the remote UE. In this way, the relay UE determines whether to listen to the paging message for the remote UE, or the remote UE determines whether to listen to the paging message.

The following describes the communications method according to this embodiment of this application.

The technical solutions in this embodiment of this application may be applied to a wireless communications system, for example, the communications system shown in FIG. 1. A communications apparatus in the wireless communications system may include a network device, a first terminal device, and a second terminal device, and there may be a wireless communications connection relationship between the communications apparatuses. The network device in the communications apparatus may correspond to the network device shown in FIG. 1, or may be a chip configured in the network device. The first terminal device in the communications apparatus may correspond to the remote terminal device shown in FIG. 1, or may be a chip configured in the remote terminal device. The second terminal device in the communications apparatus may correspond to the relay terminal device shown in FIG. 1, or may be a chip configured in the relay terminal device.

It should be understood that, in the embodiment shown below, "predefinition" may be implemented by prestoring corresponding code or a corresponding table in a device (for example, the terminal device or the network device), in another manner that can indicate related information, or preconfiguring by the network device. A specific implementation of "predefinition" is not limited in this application.

It should be further understood that "storing" in embodiments of this application may be storage in one or more memories. The one or more memories may be separately disposed, or may be integrated into an encoder or a decoder, a processor, or a communications apparatus. Alternatively, a part of the one or more memories may be separately disposed, and a part of the one or more memories are integrated into the translator, the processor, or the communications apparatus. A type of the memory may be a storage medium in any form. This is not limited in this application.

It should be further understood that the "protocol" in embodiments of this application may be a standard protocol in the communications field, and for example, may include an LTE protocol, an NR protocol, and a related protocol applied to a future communications system. This is not limited in this application.

Without loss of generality, the following first describes embodiments of this application in detail by using a communications process of a pair of a first terminal device and a second terminal device (that is, a relay terminal device and a remote terminal device) as an example. It may be understood that any pair of a first terminal device and a second terminal device (that is, a relay terminal device and a remote terminal device) in the wireless communications system, or chips configured in a pair of a first terminal device and a second terminal device (that is, a relay terminal device and a remote terminal device) in the wireless communications system may perform communication based on a same method. Any network device in the wireless communications system or a chip configured in the network device may perform communication based on a same method. This is not limited in this application.

In this embodiment of this application, the first terminal device may communicate with the network device by using the second terminal device, and the first terminal device may communicate with the second terminal device through a sidelink. For example, a protocol stack structure between the first terminal device, the second terminal device, and the network device may be a protocol stack structure shown in FIG. 2.

Figure 4:
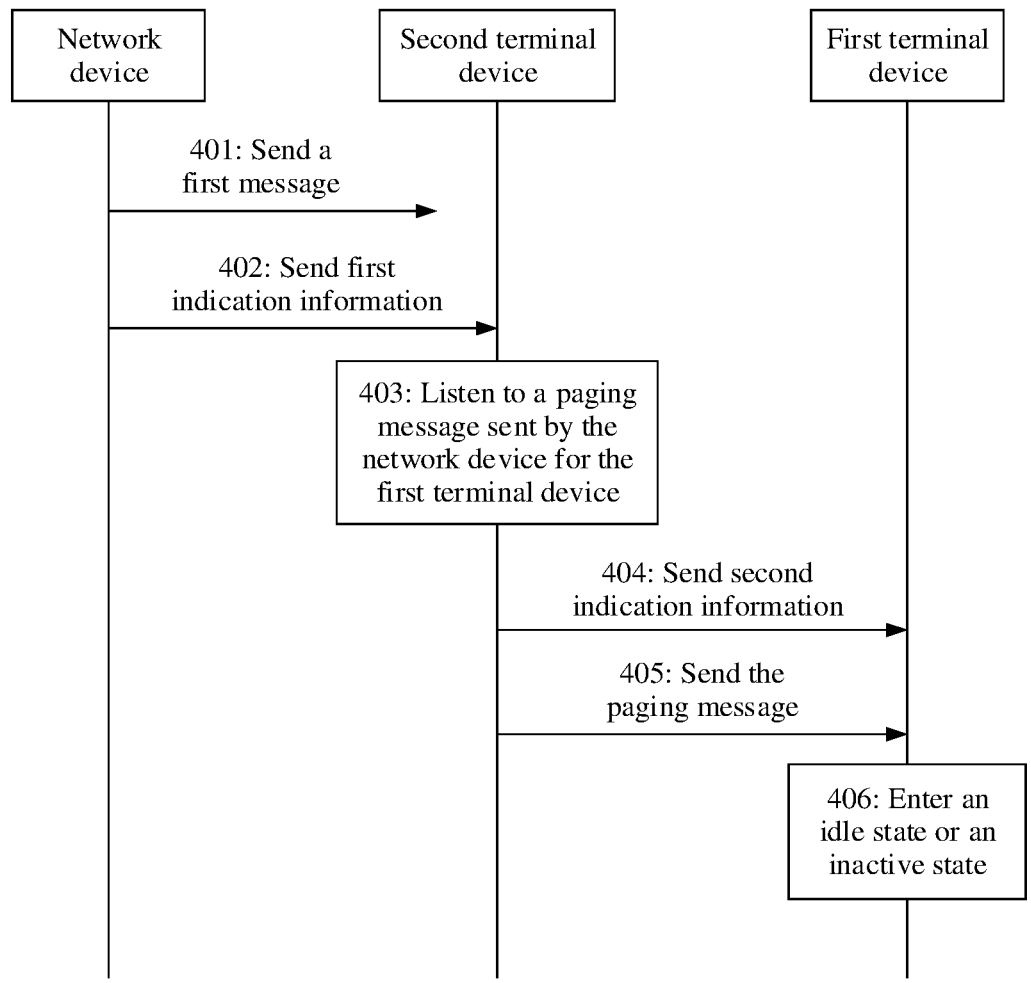
FIG. 4 is a schematic flowchart of a communications method according to an embodiment of this application.

FIG. 4 is a schematic flowchart of a communications method 400 according to an embodiment of this application. In the method 400, when releasing or suspending a radio resource control RRC connection between a first terminal device and a network device, the network device may indicate a second terminal device (for example, a relay terminal device or relay UE) to listen to a paging message for the first terminal device (for example, a remote terminal device or remote UE). Correspondingly, the second terminal device listens to the paging message based on an indication of the network device, and indicates the first terminal device to enter an RRC idle state or an RRC inactive state. The first terminal device may enter the RRC idle state or the RRC inactive state based on an instruction of the second terminal device.

The communications method shown in FIG. 4 includes steps 401 to 406.

401: Optionally, the network device sends a first message, where the first message is used to release or suspend the radio resource control RRC connection between the first terminal device and the network device.

When the first message is used to release the RRC connection between the first terminal device and the network device, the first message is used to configure the first terminal device to enter the idle state, that is, RRC idle. For example, the first message may be an RRC connection release message.

When the first message is used to suspend the RRC connection between the first terminal device and the network device, the first message is used to configure the first terminal device to enter the RRC inactive state. For example, the first message may be an RRC connection suspend message.

In a possible implementation, when determining that there is no downlink (DL) data or signaling that needs to be sent to the first terminal device currently, or no uplink (UL) data or signaling is received from the first terminal device within first preset duration, the network device may determine to release or suspend the RRC connection between the first terminal device and the network device, that is, determine to switch an RRC status of the first terminal device from an RRC connected state to the RRC idle state or the RRC inactive state. In this case, the network device may perform the step 401, that is, send the foregoing first message.

For example, the first preset duration may be predefined. For example, the network device may prestore the first preset duration, or the first preset duration is defined in a protocol. This is not limited in this application.

In this embodiment of this application, the UL data may include, for example, a MAC PDU or a transport block (TB), and the UL signaling may include, for example, an RRC message or a MAC CE, for example, sidelink UE information. The DL data may include, for example, a MAC PDU or a TB, and the DL signaling may include, for example, an RRC message or a MAC CE, for example, an RRC reconfiguration message.

Optionally, the network device may send the first message to the second terminal device.

In some possible embodiments, when the first message is successfully sent to the second terminal device and successfully decoded by the second terminal device, the second terminal device can determine, based on the first message, that the RRC status of the first terminal device is the RRC idle state or the RRC inactive state.

However, in some other possible embodiments, when the first message is not successfully sent to the second terminal device, or the first message is not successfully decoded by the second terminal device, because the second terminal device cannot read the RRC message sent by the network device to the first terminal device, the second terminal device cannot determine (that is, does not know) the RRC status of the first terminal device.

In a possible implementation, the network device may determine, based on whether a feedback message that is sent by the second terminal device and that corresponds to the first message is received, whether the first message is successfully sent to the second terminal device or whether the first message is successfully decoded by the second terminal device.

For example, when successfully receiving and decoding the first message, the second terminal device may send an acknowledgment (ACK) message to the network device to indicate that the first message is successfully received and decoded. When failing to receive or decode the first message within second preset duration, the second terminal device may send a negative acknowledgment (NACK) message to the network device to indicate that the first message is not successfully received or successfully decoded.

For example, the second preset duration may be predefined. For example, the second preset duration may be prestored in the terminal device, the network device may indicate the second preset duration to the second terminal device in advance, or the second preset duration is defined in a protocol. This is not limited in this embodiment of this application.

In some optional embodiments, the second terminal device may determine that RRC statuses of the network device and the first terminal device are not aligned.

In a possible implementation, if determining that the first message from the network device is not successfully received or the first message is not successfully decoded, the second terminal device cannot determine the RRC status of the first terminal device, that is, may determine that the RRC statuses of the network device and the first terminal device are not aligned.

For example, the network device determines that the first terminal device enters the RRC idle state, but the second terminal device does not receive an RRC connection release message or fails to decode the RRC connection release message. Therefore, the second terminal device does not determine the RRC status of the first terminal device. In this case, the first terminal device is still in the RRC connected state. In this case, it may be considered that the RRC statuses of the network device and the first terminal device are not aligned, that is, the RRC statuses mismatch.

Optionally, after the step 401, if the network device has the downlink data or signaling that needs to be sent to the first terminal device, the network device may send a paging message used to page the first terminal device.

402: The network device sends first indication information, where the first indication information indicates the second terminal device to listen to the paging message for the first terminal device. The paging message may be used by the network device to page the first terminal device.

It may be understood that when the second terminal device listens to the paging message for the first terminal device, the RRC status of the first terminal device is the RRC idle state or the RRC inactive state. Therefore, that the first indication information indicates the second terminal device to listen to the paging message for the first terminal device may be further replaced with: The first indication information indicates that the RRC status of the first terminal device is the RRC idle state or the RRC inactive state, or the first indication information indicates that the RRC status of the first terminal device is handed over from the RRC connected state to the RRC idle state or the RRC inactive state.

In some possible embodiments, the first indication information may include an identifier of the first terminal device. For example, when the second terminal device is connected to a plurality of terminal devices, (that is, can simultaneously communicate with the plurality of terminal devices through a sidelink), the first indication information may include the identifier of the first terminal device. In this case, the identifier of the first terminal device can be used to indicate the second terminal device to listen to a paging message for a first terminal device in the plurality of terminal devices.

In some possible embodiments, the first indication information may be carried in an RRC message or media access control (MAC) control element (CE) signaling. For example, the RRC message may be an RRC reconfiguration message or another RRC message. This is not limited.

In a possible implementation, a field may be defined in the RRC message or the MAC CE signaling, and the field may indicate whether the second terminal device needs to replace the first terminal device to listen to the paging message. For example, when the field is 0, it may indicate that the second terminal device does not need to replace the first terminal device to listen to the paging message; when the field is 1, it may indicate that the second terminal device needs to replace the first terminal device to listen to the paging message; or vice versa. This is not limited.

In some possible embodiments, the network device may send the first indication information when sending the first message, for example, when sending the first message, before sending the first message, or after sending the first message. In other words, regardless of whether the network device successfully sends the first message, the network device sends the first indication information to ensure that the second terminal device can replace the first terminal device to listen to the paging message sent by the network device.

In some other possible embodiments, the network device may send the first indication information when determining that the first message is not successfully sent. For example, the first indication information may be sent to the second terminal device after the NACK message fed back by the second terminal device is received. In this way, when the first message is not successfully sent, the first indication information is sent, so that when the first message is not received, the second terminal device can replace the first terminal device to listen to the paging message sent by the network device.

In some possible embodiments, when the second terminal device is in the RRC connected state, the network device may directly send the first indication information to the second terminal device in the RRC connected state.

In some other possible embodiments, for example, when the second terminal device is in the RRC idle state or the RRC inactive state, before sending the first indication information to the second terminal device, the network device may further send the paging message or an RRC establishment message to the second terminal device, so that the second terminal device enters the RRC connected state from the RRC idle state or the RRC inactive state. After the second terminal device enters the RRC connected state, the network device may send the first indication information to the second terminal device.

Correspondingly, the second terminal device may receive the first indication information sent by the network device.

Optionally, the network device may further indicate, to the second terminal device, whether the first terminal device enters the RRC idle state or the RRC inactive state. For example, the network device may add an indication field to the paging message used to page the first terminal device, a MAC header of the MAC PDU that includes the paging message, or the RRC message, to indicate whether the first terminal device enters the RRC idle state or the RRC inactive state.

403: The second terminal device listens to the paging message sent by the network device for the first terminal device.

After receiving the first indication information, the second terminal device may listen, based on the first indication information, to the paging message sent by the network device for the first terminal device. For example, the paging message may be listened to on a PO of the first terminal device, or the paging message of the first terminal device may be listened to on a PO of the second terminal device. This is not limited in this application.

In some possible embodiments, when the first indication information includes the identifier of the first terminal device, the second terminal device may listen, based on the identifier of the first terminal device, to the paging message sent by the network device for the first terminal device.

It may be understood that, when the second terminal device listens to the paging message sent by the network device for the first terminal device, the second terminal device may determine (or consider) that the RRC status of the first terminal device is the RRC idle state or the RRC inactive state.

404: The second terminal device sends second indication information to the first terminal device, where the second indication information indicates the first terminal device to enter the idle state or the inactive state. Correspondingly, the first terminal device receives the second indication information.

For example, the second terminal device may send the second indication information to the first terminal device through a sidelink between the second terminal device and the first terminal device. For example, the second indication information is carried in a sidelink RRC message, the MAC CE, or the MAC header. Alternatively, the second indication information may further indicate the first terminal device to release a radio link resource, which may be a bearer configuration of an air-interface link configuration, for example, a Uu SDAP configuration and/or a Uu PDCP configuration. Optionally, the second indication information may further indicate the first terminal device to release one or more of the following: an SL RLC configuration, a MAC configuration, an SL bearer configuration, an SL LCH configuration, and the like.

It should be noted that a sequence of step 403 and step 404 is not limited in this embodiment of this application. For example, step 403 may be performed before, after, or simultaneously with step 404. In addition, in some embodiments, step 404 may be an optional step, that is, step 404 may not be performed.

405: The second terminal device sends the paging message to the first terminal device.

Specifically, when the second terminal device receives (listens to or obtains) the paging message sent by the network device for the first terminal device, the second terminal device may send (or forward) the paging message to the first terminal device. For example, after listening to the paging message for the first terminal device on the PO of the first terminal device or after listening to the paging message for the first terminal device on the PO of the second terminal device, the second terminal device may send (or forward) the paging message to the first terminal device through a PC5 sidelink.

Before step 405, when the second terminal device does not receive the indication information that is sent by the first terminal device and that indicates the RRC status, the second terminal device cannot determine the RRC status of the first terminal device.

In some optional embodiments, for example, after step 404, simultaneously with step 404, before step 405, after step 405, or simultaneously with step 405, the second terminal device may send third indication information to the first terminal device. The third indication information indicates the first terminal device to release a first configuration. The first configuration may be a sidelink configuration (for example, a PC5 configuration) between the second terminal device and the first terminal device, and/or an air-interface link configuration (for example, an NR air-interface configuration) between the first terminal device and the network device.

The third indication information may be used to trigger a sidelink release process and/or an air-interface link release process. For example, the third indication information may be carried in a PC5 RRC release message. This is not limited in this application.

For example, the PC5 configuration may include a sidelink radio bearer (SLRB) configuration, a MAC configuration, a radio link control (RLC) bearer configuration, an RLC configuration, and the like. This is not limited.

In some optional embodiments, the second indication information and the third indication information may be sent in a same message, or may be respectively sent in two different messages. This is not limited in this embodiment of this application.

In some optional embodiments, the second terminal device may send the third indication information to the first terminal device without performing step 404.

Therefore, in this embodiment of this application, the first terminal device is indicated to release the sidelink configuration between the first terminal device and the second terminal device and/or the air-interface link configuration between the first terminal device and the network device, so that when entering the RRC idle state or the RRC inactive state, the first terminal device releases the sidelink configuration between the first terminal device and the second terminal device and/or the air-interface link configuration between the first terminal device and the network device.

Optionally, the second terminal device may determine, based on an indication of the network device, whether the first terminal device enters the RRC idle state or the RRC inactive state. In addition, the second terminal device may further indicate the first terminal device to enter the RRC idle state or the RRC inactive state. For example, the second terminal device may add an indication field to the MAC header of the MAC PDU that includes the paging message, to the RRC message, or to SCI, to indicate whether the terminal device enters the RRC idle state or the RRC inactive state.

In some optional embodiments, when the second terminal device has triggered the sidelink release process before step 405, that is, before the second terminal device sends the paging message to the first terminal device, the second terminal device further needs to establish or reestablish the sidelink before performing step 405 to send the paging message by using the established or reestablished sidelink.

406: The first terminal device enters the idle state or the inactive state.

For example, the first terminal device may enter the RRC idle state or the RRC inactive state after receiving the second indication information. For example, when the second indication information indicates the first terminal device to enter the RRC idle state, the first terminal device enters the RRC idle state, and performs behavior of entering the idle state, including but not limited to resetting MAC, stopping a running timer, discarding an inactive-state context of UE, and the like. When the second indication information indicates the first terminal device to enter the RRC inactive state, the first terminal device enters the RRC inactive state.

Optionally, after receiving the second indication information, the first terminal device may further release the sidelink configuration (for example, the PC5 link configuration) between the second terminal device and the first terminal device, and/or the air-interface link configuration (for example, the NR air-interface configuration) between the first terminal device and the network device. This is not limited in this application.

In another example, the first terminal device may enter the RRC idle state or the RRC inactive state after receiving the paging message forwarded by the second terminal device in step 405. In this case, the paging message may further indicate the first terminal device to enter the RRC idle state or the RRC inactive state.

Optionally, after receiving the paging message, the first terminal device may further release the sidelink configuration (for example, the PC5 link configuration) between the second terminal device and the first terminal device, and/or the air-interface link configuration (for example, the NR air-interface configuration) between the first terminal device and the network device. This is not limited in this application.

In another example, after receiving the third indication information, the first terminal device may release the sidelink configuration (for example, the PC5 link configuration) between the second terminal device and the first terminal device, and/or the air-interface link configuration (for example, the NR air-interface configuration) between the first terminal device and the network device. Optionally, in this case, the first terminal device may enter the RRC idle state or the RRC inactive state.

In an example, behavior of entering the RRC idle state or the RRC inactive state by the first terminal device may specifically include resetting the MAC configuration, releasing a radio resource, indicating release of the RRC connection and a release cause to an upper layer, and the like. This is not limited.

When the sidelink configuration (for example, the RLC configuration or the MAC configuration) of the first terminal device is provided by the network device, the sidelink configuration is released when (or after) the first terminal device enters the RRC idle state or the RRC inactive state.

When the sidelink configuration (for example, the RLC configuration or the MAC configuration) of the first terminal device is provided by the network device, and the first terminal device configures the sidelink for the second terminal device by using the PC5 sidelink, the sidelink configuration is released when (or after) the first terminal device enters the RRC idle state or the RRC inactive state, and a PC5 RRC process is initiated, for example, an RRC establishment or resumption process or an RRC reconfiguration process, to notify the second terminal device to release the sidelink configuration.

Optionally, after receiving the paging message forwarded by the second terminal device, and entering the RRC idle state or the RRC inactive state, the first terminal device may initiate the RRC establishment or resumption process between the first terminal device and the network device. Specifically, the first terminal device may release a previous old air-interface link configuration by entering the RRC idle state or the RRC inactive state, and initiate the RRC establishment or resumption process with the network device based on the paging message to establish or resume the RRC connection, thereby reconfiguring an RRC link.

In some optional embodiments, when the RRC status of the first terminal device is handed over from the RRC connected state to the RRC idle state or the RRC inactive state, the first terminal device may further send the first indication information to the second terminal device to indicate, to the second terminal device, that the RRC status of the first terminal device is the RRC idle state or the RRC inactive state, indicate the RRC status of the first terminal device is handed over from the RRC connected state to the RRC idle state or the RRC inactive state, or indicate the second terminal device to listen to the paging message sent by the network device.

For example, when the RRC status of the first terminal device is handed over from the RRC connected state to the RRC idle state, the first indication information indicates that the RRC status of the first terminal device is the RRC idle state, or indicates that the RRC status of the first terminal device is handed over from the RRC connected state to the RRC idle state. When the RRC status of the first terminal device is handed over from the RRC connected state to the RRC inactive state, the first indication information indicates that the RRC status of the first terminal device is the RRC inactive state, or indicates that the RRC status of the first terminal device is handed over from the RRC connected state to the RRC inactive state.

Optionally, at least one of the first terminal device or the network device may send the first indication information to the second terminal device. For example, when the first terminal device sends the first indication information to the second terminal device, step 402 may not be performed, or the second terminal device fails to receive or decode a message that is sent by the network device and that carries the first indication information. For another example, when the network device sends the first indication information to the second terminal device, the first terminal device may not send the first indication information to the second terminal device, or the second terminal device fails to receive or decode a message that is sent by the first terminal device and that carries the first indication information.

In some possible embodiments, for example, when the second terminal device receives the first indication information from the first terminal device, and does not receive the first indication information from the network device, the second terminal device may further indicate, to the network device, that the RRC status of the first terminal device is handed over from the RRC connected state to the RRC idle state or the RRC inactive state.

In a possible implementation, when there is no data or signaling that needs to be sent to the network device currently, or when data or signaling sent by the network device is not received within third preset duration, the first terminal device may determine that the current RRC status is handed over from the RRC connected state to the RRC idle state or the RRC inactive state. This is not limited in this application.

For example, the third preset duration may be predefined. For example, the terminal device may store the third preset duration in advance, the network device may indicate the third preset duration to the second terminal device in advance, the third preset duration is defined in a protocol, or the network configures the third preset duration by using signaling. This is not limited in this embodiment of this application.

In a possible implementation, the first terminal device may send the first indication information to the second terminal device through the sidelink (for example, a PC5 link) between the first terminal device and the second terminal device. This is not limited in this application.

Therefore, in this embodiment of this application, the second terminal device is indicated to listen to the paging message for the first terminal device, so that the second terminal device can determine the RRC status of the first terminal device to be the RRC idle state or the RRC inactive state, and determine to need to listen to the paging message for the first terminal device. Further, the second terminal device may indicate the first terminal device to enter the RRC idle state or the RRC inactive state. This helps align the RRC statuses of the first terminal device between the network device, the first terminal device, and the second terminal device.

For example, this embodiment of this application is applicable to a scenario in which the second terminal device fails to receive or decode the first message used to release or suspend the RRC connection between the first terminal device and the network device. In this case, the second terminal device cannot determine the RRC status of the first terminal device because the second terminal device fails to receive or decode the first message. In this case, once receiving an instruction for listening the paging message for the first terminal device, the second terminal device may determine that the first terminal device is in the RRC idle state or the RRC inactive state, and may further indicate the first terminal device to enter the RRC idle state or the inactive state. In this way, the network device, the second terminal device, and the first terminal device all sense that the first terminal device is in the RRC idle state or the inactive state. This can help align the RRC statuses of the first terminal device between the network device, the first terminal device, and the second terminal device.

When the network device, the first terminal device, and the second terminal device align the RRC statuses of the first terminal device, data transmission can be performed more efficiently between the network device, the first terminal device, and the second terminal device. For example, the second terminal device can determine to listen to the paging message for the first terminal device or receive downlink data or signaling transmission, and implement receiving and forwarding of the paging message or data from the network device.

Figure 5:
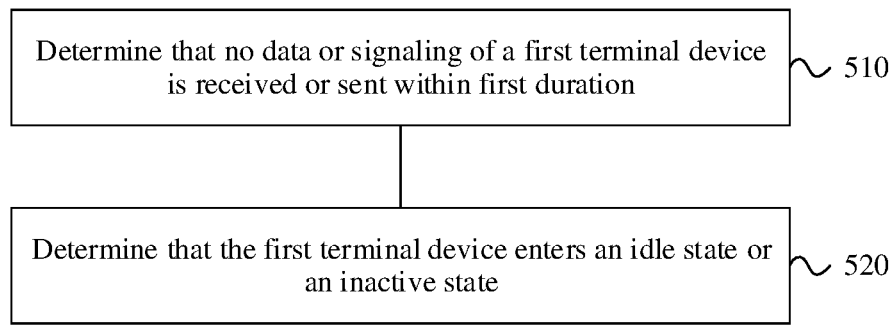
FIG. 5 is a schematic flowchart of another communications method according to an embodiment of this application.

FIG. 5 is a schematic flowchart of another communications method 500 according to an embodiment of this application. In the method 500, when it is determined that no data or signaling of a first terminal device is received or sent within first duration, it may be determined that the first terminal device enters an idle state or an inactive state. In an example, the method 500 may be performed by a second terminal device (or a chip in the second terminal device), the first terminal device (or a chip in the first terminal device), or a network device (or a chip in the network device). This is not limited in this application. As shown in FIG. 5, the method 500 includes steps 510 and 520.

510: Determine that no data or signaling of the first terminal device is received or sent within the first duration.

In some embodiments, it may be determined that no data or signaling of the first terminal device is received within the first duration, and no data or signaling of the first terminal device is sent.

For example, when the method 500 is executed by the second terminal device, the second terminal device may determine that DL data or signaling that is delivered by the network device and that needs to be forwarded to the first terminal device is not received within the first duration, and UL data or signaling that is sent by the first terminal device and that needs to be forwarded to the network device is not received within the first duration.

For example, when the method 500 is executed by the first terminal device, the first terminal device may determine that there is no UL data or signaling that needs to be sent to the network device within the first duration, and no DL data or signaling that is sent by the second terminal device and that is from the network device is received within the first duration.

For example, when the method 500 is performed by the network device, the network device may determine that there is no DL data or signaling that needs to be sent to the first terminal device within the first duration, and no UL data or signaling from the first terminal device is received within the first duration.

For example, in this embodiment of this application, the first duration may be predefined. For example, the network device, the first terminal device, or the second terminal device may prestore the first duration, the first duration is defined in a protocol, the network device may configure the first duration, the second terminal device may configure the first duration, or the first terminal device may configure the first duration. This is not limited in this application.

For example, when the first duration is configured by the network device, the network device may indicate (for example, by sending indication information) the first duration to the first terminal device or the second terminal device, or the network device may indicate the first duration to the second terminal device. Further, the second terminal device indicates the first duration to the first terminal device. This is not limited in this application.

For example, when the first duration is configured by the second terminal device, the second terminal device may indicate (for example, by sending indication information) the first duration to the network device or the first terminal device.

For example, when the first duration is configured by the first terminal device, the first terminal device may indicate (for example, by sending indication information) the first duration to the network device or the second terminal device, or the first terminal device may indicate the first duration to the second terminal device. Further, the second terminal device may indicate the first duration to the network device. This is not limited in this application.

In a possible implementation, a timer, for example, a data inactivity timer, may be set to determine whether no data or signaling of the first terminal device is received or sent within the first duration. For example, the timer may be set to expire when timing reaches the first duration. Optionally, the timer may be started when the data or signaling is received or sent. When the timer expires, it may be determined that no data or signaling is received or sent within the first duration.

In some embodiments, a timer may be set inside the second terminal device. The timer may be dedicated to forwarded data. In this case, data or signaling of one or more first terminal devices that can perform sidelink communication with the second terminal device may trigger the timer.

In some embodiments, when the second terminal device can perform sidelink communication with at least two first terminal devices, the second terminal device may define, maintain, or run one of the foregoing timers for each first terminal device. In this case, data or signaling of each first terminal device may trigger a timer corresponding to the first terminal device.

In some embodiments, there may be only one timer inside the second terminal device. The timer may be used for air-interface data (for example, Uu data) and forwarded data. In this case, both data or signaling of one or more first terminal devices that can perform sidelink communication with the second terminal device, and data or signaling of the second terminal device may trigger the timer.

In a specific example, the network device may define a timer (for example, a data inactivity timer) for a PC5 MAC of the first terminal device. A MAC of the second terminal device is a PC5 MAC entity, and there is no end-to-end MAC between the second terminal device and the network device. In addition, the MAC receives a MAC service data unit (SDU) of a sidelink logical channel (SL LCH), for example, a sidelink control channel (SCCH) or a sidelink traffic channel (STCH); or sends a MAC SDU corresponding to the SL LCH.

For the timer of the first terminal device, the timer may be started or restarted when the first terminal device sends a MAC SDU corresponding to a forwarding-dedicated SCCH or STCH, and when the first terminal device receives the MAC SDU corresponding to the forwarding-dedicated SCCH or SRCH, starts or restarts the timer. In this way, when the first terminal device neither sends the MAC SDU of the SCCH or STCH nor receives the MAC SDU from the SCCH or SRCH within the first duration, the timer expires.

For example, when defining the timer on the first terminal device side, the network device defines the first duration. Alternatively, the first terminal device may prestore the first duration, the first duration is defined in the protocol, or the network device indicates the first duration. This is not limited in this application.

It should be noted that the foregoing description is provided by using an example in which the timer is set on the first terminal device side. For timers on the second terminal device side and the network device side, refer to description of the timer on the first terminal device side, or some simple adaptation needs to be performed. This falls within the protection scope of embodiments of this application.

520: Determine that the first terminal device enters the idle state or the inactive state.

For example, when determining that no data or signaling of the first terminal device is received or sent within the first duration, the second terminal device may determine that the first terminal device enters the RRC idle state or the RRC inactive state. Optionally, the data or signaling is data or signaling that needs to be forwarded by the second terminal device to the network device or another terminal device.

For example, when determining that no data or signaling of the first terminal device is received or sent within the first duration, the first terminal device may determine to enter the RRC idle state or the RRC inactive state.

For example, when determining that no data or signaling of the first terminal device is received or sent within the first duration, the network device may determine that the first terminal device enters the RRC idle state or the RRC inactive state.

In some optional embodiments, when determining that the first terminal device enters the idle state or the inactive state, the second terminal device may determine to listen to a paging message for the first terminal device.

Optionally, the second terminal device may further send second indication information to the network device or the first terminal device. The second indication information indicates the first terminal device to enter the RRC idle state or the RRC inactive state. In this way, the second terminal device indicates, to the network device, that the first terminal device enters the idle state or the inactive state. This helps align RRC statuses of the first terminal device between the network device, the first terminal device, and the second terminal device.

In some optional embodiments, when determining to enter the idle state or the inactive state, the first terminal device may send second indication information to the network device or the second terminal device. The second indication information indicates the first terminal device to enter the RRC idle state or the RRC inactive state.

In some optional embodiments, when determining that the first terminal device enters the idle state or the inactive state, the network device may send second indication information to the first terminal device or the second terminal device. The second indication information indicates the first terminal device to enter the RRC idle state or the RRC inactive state.

In some optional embodiments, when determining to enter a connected state, the first terminal device may send indication information to the second terminal device or the network device. The indication information indicates the first terminal device to enter the RRC connected state. After receiving the indication information, the second terminal device stops listening to the paging message for the first terminal device. This step may be used in combination with another step in this embodiment, or may be used as an independent method. This is not limited.

It should be noted that, in this embodiment of this application, when it is determined that the first terminal device enters the RRC idle state, the second indication information indicates the first terminal device to enter the RRC idle state. When it is determined that the first terminal device enters the RRC inactive state, the second indication information indicates the first terminal device to enter the RRC inactive state.

Therefore, in this embodiment of this application, at least one of the network device, the first terminal device, and the second terminal device may determine, by determining that no data or signaling of the first terminal device is received or sent within the first duration, that the first terminal device enters the idle state or the inactive state. This can help align the RRC statuses of the first terminal device between the network device, the first terminal device, and the second terminal device. For example, the network device, the first terminal device, and the second terminal device all sense that the first terminal device is in the RRC idle state, inactive state, or connected state.

When the network device, the first terminal device, and the second terminal device align the RRC statuses of the first terminal device, data transmission can be performed more efficiently between the network device, the first terminal device, and the second terminal device. For example, the second terminal device can determine to listen to the paging message for the first terminal device or receive downlink data or signaling transmission, and implement receiving and forwarding of the paging message or data from the network device.

In some embodiments, when the first terminal device does not send the UL data or signaling or receives no DL data or signaling within the first duration, the first terminal device may determine to enter the RRC idle state or the RRC inactive state. For example, the timer may be set on the first terminal device side to determine whether the first terminal device does not send the UL data or signaling or receive the DL data or signaling within the first duration. In this case, the second terminal device may determine the RRC status of the first terminal device by using a method 600 shown in FIG. 6 or a method 700 shown in FIG. 7.

Figure 6:
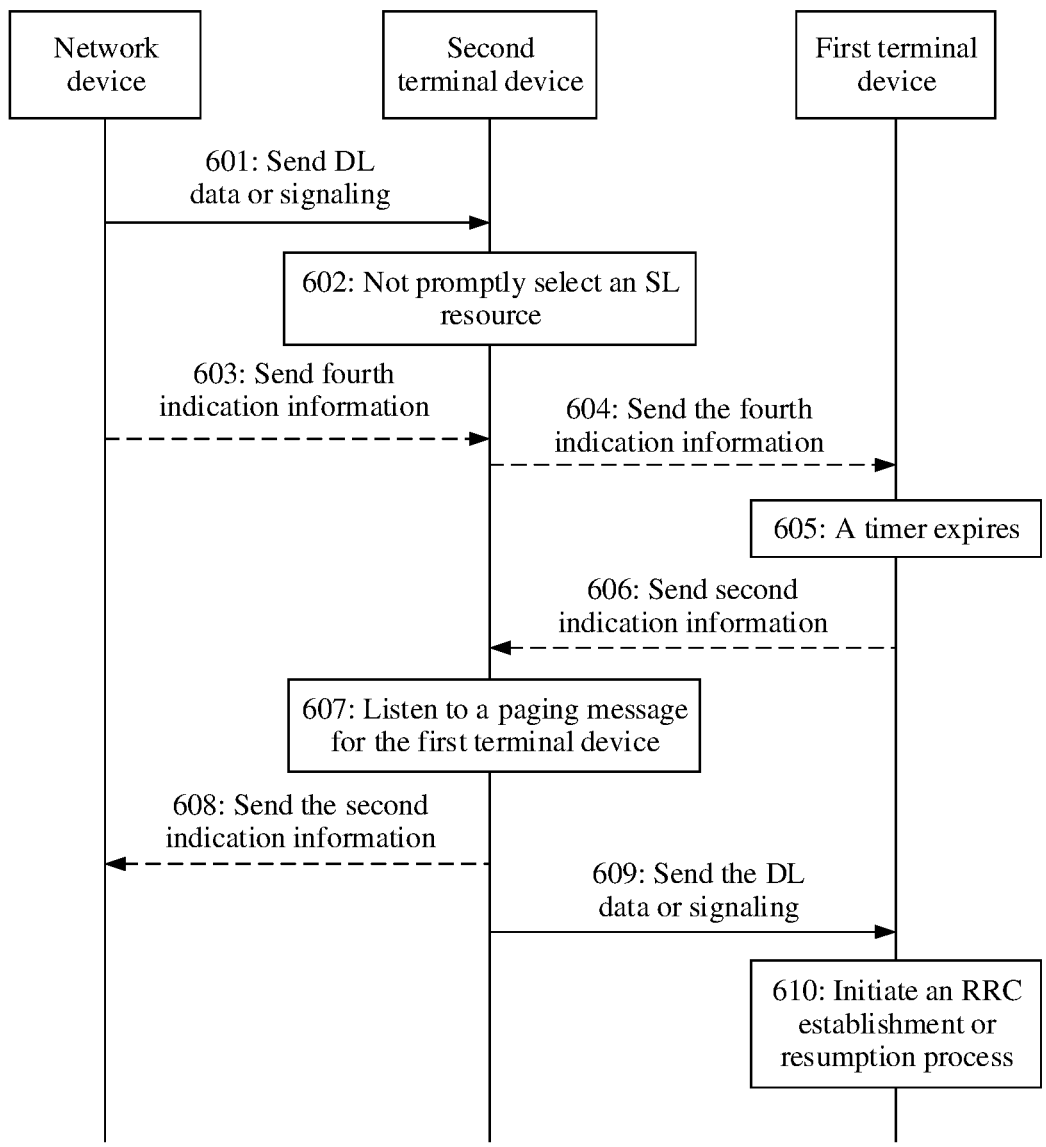
FIG. 6 is a schematic flowchart of another communications method according to an embodiment of this application.

FIG. 6 is a schematic flowchart of another communications method 600 according to an embodiment of this application. In the method 600, when determining to enter an RRC idle state or an RRC inactive state, a first terminal device may indicate an RRC status of the first terminal device to a second terminal device, so that the second terminal device determines the RRC status of the first terminal device.

It should be understood that FIG. 6 shows steps or operations of the communications method. However, the steps or operations are merely examples. In this embodiment of this application, other operations or variations of the operations in FIG. 6 may be alternatively performed. In addition, the steps in FIG. 6 may be performed in a sequence different from that presented in FIG. 6, and it is possible that not all operations in FIG. 6 need to be performed. As shown in FIG. 6, the communications method may include steps 601 to 610.

601: Optionally, a network device sends DL data or signaling to the second terminal device. Correspondingly, the second terminal device receives the DL data or signaling. The DL data or signaling is DL data or signaling that is sent by the network device and that needs to be forwarded to the first terminal device.

602: Optionally, the second terminal device does not promptly obtain (or select) an SL resource.

For example, when the second terminal device does not select the SL resource within a second duration range; the second terminal device does not select a resource meeting a delay requirement; the second terminal device does not obtain, within a second duration range, the SL resource scheduled by a base station; the SL resource obtained by the second terminal device is unavailable within a second duration range; or the second terminal device has no available SL resource within a second duration range, it may be determined that the second terminal device does not promptly select the SL resource. The SL resource may be, for example, a mode 2 SL resource. This is not limited.

For example, in this embodiment of this application, the second duration may be predefined. For example, the second terminal device may prestore the second duration, the second duration is defined in a protocol, or the network device may indicate the second duration to the second terminal device. This is not limited in this application.

Optionally, in 603, the network device sends fourth indication information to the second terminal device. The fourth indication information indicates first duration. If a timer does not receive or send the data or signaling of the first terminal device within the first duration, the timer expires. After receiving the fourth indication information, the second terminal device may perform step 604 to send the fourth indication information to the first terminal device.

Alternatively, steps 603 and 604 may not be performed, but the first terminal device determines the first duration.

Alternatively, the second terminal device may determine the first duration, and after determining the first duration, perform step 604, that is, send the fourth indication information to the first terminal device to indicate the first duration.

It should be noted that steps 603 and 604 may occur at any moment before step 605, for example, may occur before step 601 or simultaneously with step 601, may occur before step 602 or simultaneously with step 602, or may occur after step 602. This is not limited in this application.

605: The timer on the first terminal device side expires.

For example, when receiving the DL data or signaling forwarded by the second terminal device from the network device, or when the first terminal device needs to send the UL data or signaling to the second terminal device to the network device, the first terminal device may start or restart the timer. When the first terminal device does not receive the DL data or signaling or send the UL data or signaling within the first duration after the timer is started or restarted, the timer on the first terminal device side expires.

When the timer on the first terminal device side expires, the first terminal device may determine to enter an RRC idle state or an RRC inactive state from an RRC connected state.

It should be noted that, because the second terminal device does not promptly select the SL resource, the DL data or signaling sent by the network device for the first terminal device fails to be sent to the first terminal device, and consequently the timer on the first terminal device side expires. In this case, the network device may still consider that the first terminal device is in the RRC connected state, and the second terminal device cannot determine an RRC status of the first terminal device. As a result, RRC statuses of the first terminal device between the network device, the first terminal device, and the second terminal device mismatch.

606: The first terminal device sends second indication information to the second terminal device, where the second indication information indicates the first terminal device to enter the RRC idle state or the RRC inactive state. Correspondingly, the second terminal device receives the second indication information.

For example, the second indication information may be carried in a PC5 RRC message. To be specific, the first terminal device may indicate, by using the PC5 RRC message, the second terminal device to enter the RRC idle state or the RRC inactive state. Alternatively, the second indication may be carried in a MAC CE or sidelink control information (SCI).

607: The second terminal device listens to a paging message for the first terminal device.

For example, the second terminal device may determine, based on the second indication information, that the first terminal device enters the RRC idle state or the RRC inactive state. In this case, the second terminal device may listen, for the first terminal device, to the paging message sent by the network device.

Therefore, in this embodiment of this application, the first terminal device indicates the second terminal device that the first terminal device enters the RRC idle state or the inactive state, so that the second terminal device can determine that the RRC status of the first terminal device is the RRC idle state or the RRC inactive state, and listen to the paging message sent by the network device for the first terminal device. This helps align the RRC statuses of the first terminal device between the network device, the first terminal device, and the second terminal device. For example, the network device, the first terminal device, and the second terminal device all sense that the first terminal device is in the RRC idle state, the inactive state, or the connected state.

When the network device, the first terminal device, and the second terminal device align the RRC statuses of the first terminal device, data transmission can be performed more efficiently between the network device, the first terminal device, and the second terminal device. For example, the second terminal device can determine to listen to the paging message for the first terminal device or receive downlink data or signaling transmission, and implement receiving and forwarding of the paging message or data from the network device.

Optionally, in 608, the second terminal device sends the second indication information to the network device to indicate the first terminal device to enter the RRC idle state or the RRC inactive state. Alternatively, optionally, the first terminal device may directly send the second indication information to the network device to indicate the first terminal device to enter the RRC idle state or the RRC inactive state.

Correspondingly, the network device may receive the second indication information, and may determine, based on the second indication information, that the first terminal device enters the RRC idle state or the RRC inactive state. After determining that the first terminal device enters the RRC idle state or the RRC inactive state, if the DL data or signaling needs to be sent to the first terminal device, the network device may send the paging message used to page the first terminal device.

Therefore, in this embodiment of this application, the first terminal device or the second terminal device indicates the network device that the first terminal device enters the RRC idle state or the RRC inactive state, so that the network device can determine that the RRC status of the first terminal device is the RRC idle state or the RRC inactive state. This helps align the RRC statuses of the first terminal device between the network device, the first terminal device, and the second terminal device. For example, the network device, the first terminal device, and the second terminal device all sense that the first terminal device is in the RRC idle state, the inactive state, or the connected state.

609: The second terminal device sends the DL data or signaling to the first terminal device. Correspondingly, the first device receives the DL data or signaling. The DL data or signaling is the DL data or signaling received by the second terminal device from the network device in step 601.

For example, when selecting the SL resource, the second terminal device may send the DL data or signaling to the first terminal device on the selected SL resource.

In some embodiments, if the second terminal device does not select the SL resource, the second terminal device does not send the foregoing DL data or signaling to the first terminal device.

610: The first terminal device triggers or initiates an RRC establishment or resumption process.

For example, after receiving the DL data or signaling, the first terminal device may trigger or initiate the RRC establishment or resumption process. It should be noted that the DL data or signaling does not include an RRC release message. In other words, when receiving the RRC release message in step 609, the first terminal device does not perform step 610.

In response to the RRC establishment or resumption process initiated by the first terminal device, the network device may establish an RRC connection to the first terminal device. In this case, the network device, the first terminal device, and the second terminal device may all sense that the first terminal device is in the RRC connected state.

Figure 7:
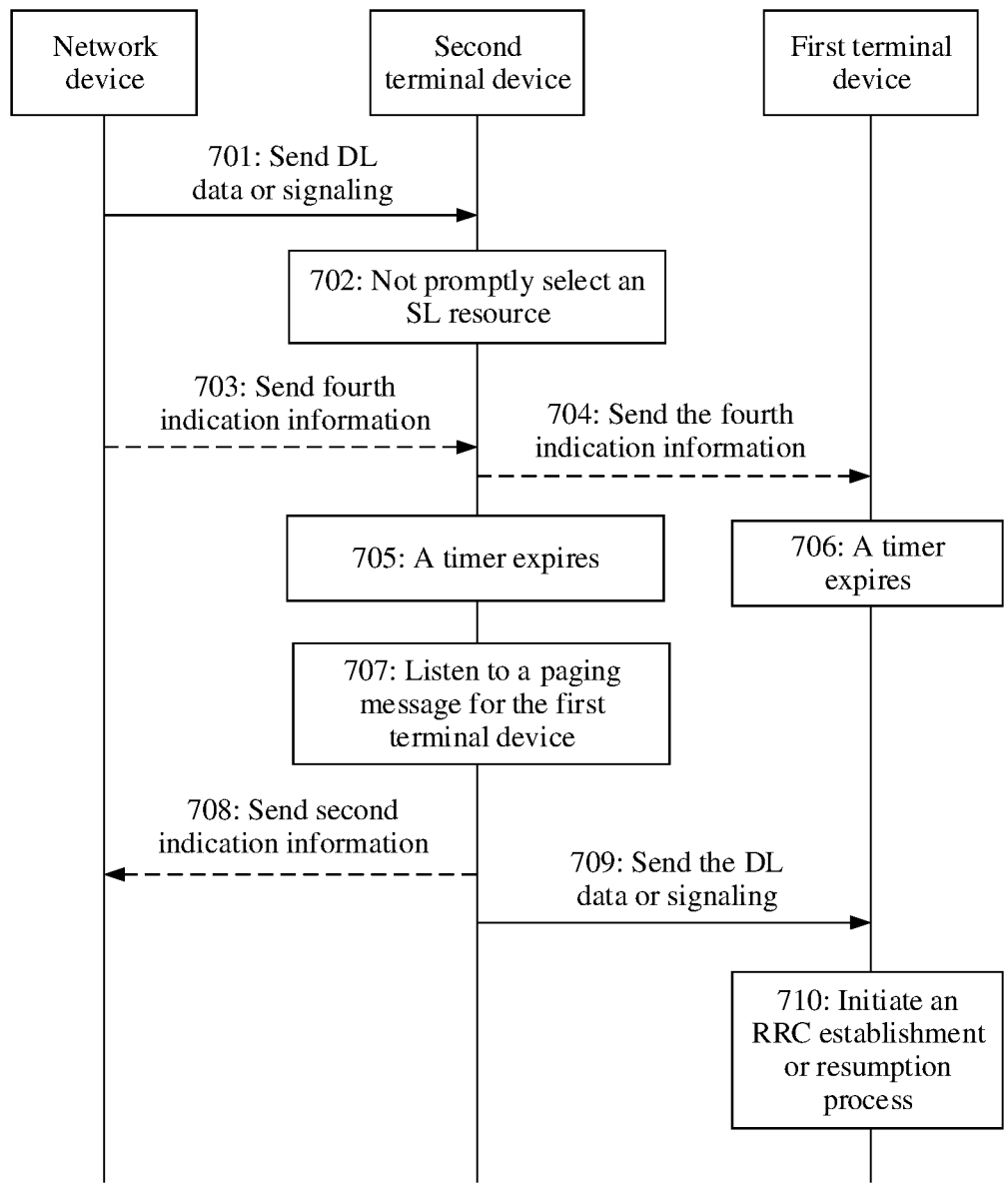
FIG. 7 is a schematic flowchart of another communications method according to an embodiment of this application.

FIG. 7 is a schematic flowchart of another communications method 700 according to an embodiment of this application. In the method 700, a timer that is the same as that on a first terminal device side may be configured on a second terminal device side, so that the second terminal device determines an RRC status of the first terminal device.

It should be understood that FIG. 7 shows steps or operations of the communications method. However, the steps or operations are merely examples. In this embodiment of this application, other operations or variations of the operations in FIG. 7 may be alternatively performed. In addition, the steps in FIG. 7 may be performed in a sequence different from that presented in FIG. 7, and it is possible that not all operations in FIG. 7 need to be performed. As shown in FIG. 7, the communications method may include steps 701 to 710.

701: A network device sends DL data or signaling to the second terminal device. Correspondingly, the second terminal device receives the DL data or signaling.

702: The second terminal device does not promptly obtain (or select) an SL resource.

Specifically, for steps 701 and 702, refer to description of steps 601 and 602 in FIG. 6. Details are not described herein again.

Optionally, in 703, the network device sends fourth indication information to the second terminal device. The fourth indication information indicates first duration. If the timer does not receive or send the data or signaling of the first terminal device within the first duration, the timer expires. After receiving the fourth indication information, the second terminal device may perform step 704 to send the fourth indication information to the first terminal device.

Alternatively, step 703 may not be performed, but the second terminal device determines the first duration. Optionally, the second terminal device may perform step 704, that is, after determining the first duration, indicate the fourth indication information to the first terminal device.

Alternatively, the first terminal device may determine the first duration, and after determining the first duration, send the fourth indication information to the second terminal device to indicate the first duration.

It should be noted that steps 703 and 704 may occur at any moment before step 705, for example, may occur before step 701 or simultaneously with step 701, may occur before step 702 or simultaneously with step 702, or may occur after step 702. This is not limited in this application.

705: The timer on the second terminal device side expires.

For example, when receiving the DL data or signaling that is sent by the network device and that corresponds to the first terminal device (for example, step 601); forwarding, to the first terminal device, the DL data or signaling that is sent by the network device; receiving UL data or signaling that is sent by the first terminal device and that needs to be sent to the network device; or forwarding the UL data or signaling sent by the first terminal device to the network device, the second terminal device may start or restart the timer. When the second terminal device does not receive or send the data or signaling corresponding to the first terminal device within the first duration after the timer is started or restarted, the timer on the second terminal device side expires.

When determining that the timer that is on the second terminal device side and that corresponds to the first terminal device expires, the second terminal device may determine that the first terminal device enters an RRC idle state or an RRC inactive state. In this case, the second terminal device may listen, for the first terminal device, to a paging message sent by the network device. Optionally, the second terminal device may send indication information to the first terminal device. The indication information indicates the second terminal device to determine that the RRC status of the first terminal device is the RRC idle state or the RRC inactive state. After receiving the indication information, when there is valid data or there is data or signaling that needs to be forwarded to the network device by using the second terminal device, the first terminal device sends or triggers an RRC connection establishment or resumption process.

In some optional embodiments, when the second terminal device communicates with a plurality of remote terminal devices through a sidelink, a plurality of timers may be configured on the second terminal device side, and each timer may correspond to one remote terminal device. In this way, when the timer expires, the second terminal device may determine that the remote terminal device corresponding to the timer enters the RRC idle state or the RRC inactive state, and may further listen, for the remote terminal device, to a paging message sent by the network device.

706: A timer on the first terminal device side expires.

For example, when receiving the DL data or signaling forwarded by the second terminal device from the network device, or when the first terminal device needs to send the UL data or signaling to the second terminal device to the network device, the first terminal device may start or restart the timer. When the first terminal device does not receive the DL data or signaling or send the UL data or signaling within the first duration after the timer is started or restarted, the timer on the first terminal device side expires.

When the timer on the first terminal device side expires, the first terminal device may determine to enter the RRC idle state or the RRC inactive state from an RRC connected state.

It should be noted that when timers are configured on both the first terminal device side and the second terminal device side, the timer on the first terminal device side and the timer on the second terminal device side may be referred to as a timer pair, and same duration may be configured or predefined for two timers in the timer pair. In some embodiments, the timer on the first terminal device side and the timer on the second terminal device side may separately expire at different moments. This is not limited in this embodiment of this application.

It should be noted that, because the second terminal device does not promptly select the SL resource, the DL data or signaling sent by the network device for the first terminal device fails to be sent to the first terminal device, and consequently the timer on the first terminal device side expires. In this case, if no timer is set on the second terminal device side, the second terminal device cannot determine the RRC status of the first terminal device, and the network device may still consider that the first terminal device is in the RRC connected state. As a result, RRC statuses of the first terminal device between the network device, the first terminal device, and the second terminal device mismatch. When the timer is set on the second terminal device side, the second terminal device may determine, when the timer on the second terminal device side expires, that the first terminal device enters the RRC idle state or the RRC inactive state. This can help align the RRC statuses of the first terminal device between the network device, the first terminal device, and the second terminal device.

When the network device, the first terminal device, and the second terminal device align the RRC statuses of the first terminal device, data transmission can be performed more efficiently between the network device, the first terminal device, and the second terminal device. For example, the second terminal device can determine to listen to the paging message for the first terminal device or receive downlink data or signaling transmission, and implement receiving and forwarding of the paging message or data from the network device.

707: The second terminal device listens to the paging message for the first terminal device.

For example, the second terminal device may determine, when the timer on the second terminal device side expires, that the first terminal device enters the RRC idle state or the RRC inactive state. In this case, the second terminal device may listen, for the first terminal device, to the paging message sent by the network device.

Therefore, in this embodiment of this application, the second terminal device can determine, when the set timer expires, that the first terminal device enters the RRC idle state or the inactive state, so that the second terminal device may listen, for the first terminal device, to the paging message sent by the network device. This helps align the RRC statuses of the first terminal device between the network device, the first terminal device, and the second terminal device. For example, the network device, the first terminal device, and the second terminal device all sense that the first terminal device is in the RRC idle state, the inactive state, or the connected state.

Optionally, in 708, the second terminal device sends second indication information to the network device to indicate the first terminal device to enter the RRC idle state or the RRC inactive state. Alternatively, optionally, the first terminal device may directly send the second indication information to the network device to indicate the first terminal device to enter the RRC idle state or the RRC inactive state.

709: The second terminal device sends the DL data or signaling to the first terminal device. Correspondingly, the first device receives the DL data or signaling.

710: The first terminal device initiates the RRC establishment or resumption process.

Specifically, for steps 708 to 710, refer to description in steps 608 to 610 in FIG. 6. Details are not described again.

It may be understood that, in the foregoing embodiments of this application, the method implemented by the network device may alternatively be implemented by a component (for example, a chip or a circuit) that can be used by the network device. The method implemented by the first terminal device may alternatively be implemented by a component (for example, a chip or a circuit) that can be used by the first terminal device. The method implemented by the second terminal device may alternatively be implemented by a component (for example, a chip or a circuit) that can be used by the second terminal device.

Figure 8:
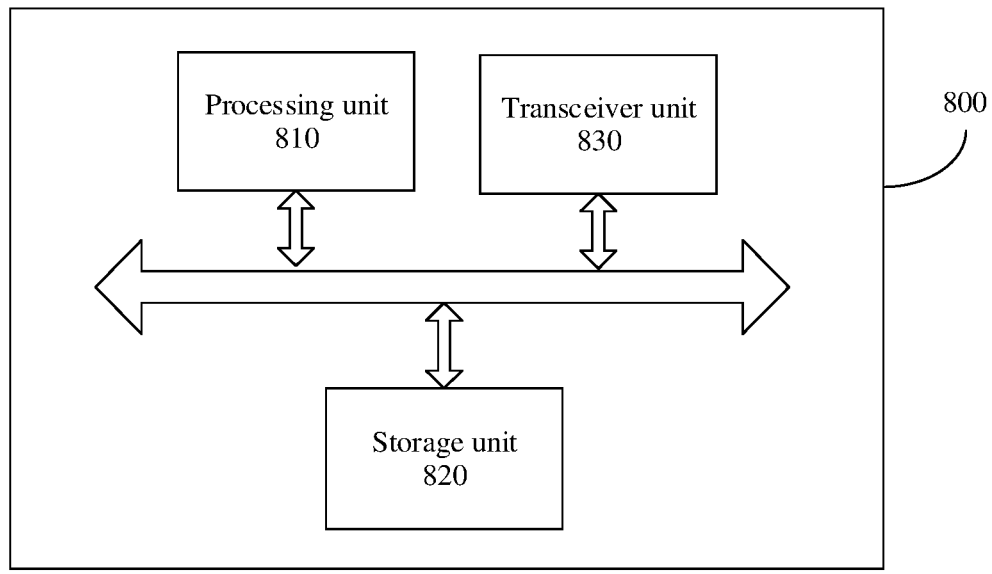
FIG. 8 is a schematic diagram of a wireless communications apparatus according to an embodiment of this application.

Based on the foregoing method, FIG. 8 is a schematic diagram of a wireless communications apparatus 800 according to an embodiment of this application.

In some embodiments, the apparatus 800 may be a network device, or may be a chip or a circuit, for example, a chip or a circuit that may be disposed in the network device. In some embodiments, the apparatus 800 may be a first terminal device, or may be a chip or a circuit, for example, a chip or a circuit that may be disposed in the first terminal device. In some embodiments, the apparatus 800 may be a second terminal device, or may be a chip or a circuit, for example, a chip or a circuit that may be disposed in the second terminal device.

The apparatus 800 may include a processing unit 810 (that is, an example of a processor) and a transceiver unit 830.

Optionally, the transceiver unit 830 may be implemented by using a transceiver, a transceiver-related circuit, or an interface circuit.

Optionally, the apparatus may further include a storage unit 820. In a possible implementation, the storage unit 820 is configured to store instructions. Optionally, the storage unit may also be configured to store data or information. The storage unit 820 may be implemented by using a memory.

In a possible design, the processing unit 810 may be configured to execute the instructions stored in the storage unit 820, so that the apparatus 800 implements the steps performed by the network device in the foregoing method.

Further, the processing unit 810, the storage unit 820, and the transceiver unit 830 may communicate with each other by using an internal connection path to transmit a control signal and/or a data signal. For example, the storage unit 820 is configured to store a computer program, and the processing unit 810 may be configured to: invoke the computer program from the storage unit 820, and run the computer program to control the transceiver unit 830 to receive a signal and/or send a signal, to complete the steps of the network device in the foregoing methods.

In a possible design, the processing unit 810 may be configured to execute the instructions stored in the storage unit 820, so that the apparatus 800 implements the steps performed by the first terminal device in the foregoing method.

Further, the processing unit 810, the storage unit 820, and the transceiver unit 830 may communicate with each other by using an internal connection path to transmit a control signal and/or a data signal. For example, the storage unit 820 is configured to store a computer program, and the processing unit 810 may be configured to: invoke the computer program from the storage unit 820, and run the computer program to control the transceiver unit 830 to receive a signal and/or send a signal, to complete the steps of the first terminal device in the foregoing methods.

In a possible design, the processing unit 810 may be configured to execute the instructions stored in the storage unit 820, so that the apparatus 800 implements the steps performed by the second terminal device in the foregoing method.

Further, the processing unit 810, the storage unit 820, and the transceiver unit 830 may communicate with each other by using an internal connection path to transmit a control signal and/or a data signal. For example, the storage unit 820 is configured to store a computer program, and the processing unit 810 may be configured to: invoke the computer program from the storage unit 820, and run the computer program to control the transceiver unit 830 to receive a signal and/or send a signal, to complete the steps of the second terminal device in the foregoing methods.

The storage unit 820 may be integrated into the processing unit 810, or may be disposed separately from the processing unit 810.

Optionally, if the apparatus 800 is a communications device, the transceiver unit 830 may include a receiver and a transmitter. The receiver and the transmitter may be same physical entities or different physical entities. When the receiver and the transmitter are the same physical entities, the physical entities may be collectively referred to as transceivers.

Optionally, if the apparatus 800 is a chip or a circuit, the transceiver unit 830 may include an input interface and an output interface.

In an implementation, it may be considered that a function of the transceiver unit 830 is implemented by using a transceiver circuit or a dedicated transceiver chip. The processing unit 810 may be implemented by using a dedicated processing chip, a processing circuit, a processing unit, or a general-purpose chip.

In another implementation, it may be considered that a communications device (for example, the network device, the first terminal device, or the second terminal device) provided in this embodiment of this application is implemented by using a general-purpose computer. To be specific, program code for implementing functions of the processing unit 810 and the transceiver unit 830 is stored in the storage unit 820, and a general-purpose processing unit executes the code in the storage unit 820 to implement the functions of the processing unit 810 and the transceiver unit 830.

In some implementations, when the apparatus 800 is the second terminal device or a chip or a circuit disposed in the second terminal device, the transceiver unit 830 is configured to receive first indication information, where the first indication information indicates the second terminal device to listen to a paging message for the first terminal device; and the processing unit 810 is configured to listen to the paging message sent by the network device for the first terminal device.

The first terminal device communicates with the network device by using the second terminal device, and the first terminal device communicates with the second terminal device through a sidelink.

Optionally, the transceiver unit 830 is further configured to send second indication information to the first terminal device, where the second indication information indicates the first terminal device to enter an idle state or an inactive state.

Optionally, the transceiver unit 830 is further configured to send third indication information to the first terminal device, and the third indication information indicates the first terminal device to release a sidelink configuration between the first terminal device and the second terminal device and/or an air-interface link configuration between the first terminal device and the network device.

Optionally, the processing unit 810 is further configured to determine that RRC statuses of the network device and the first terminal device are not aligned.

Optionally, the processing unit 810 is specifically configured to: determine that a first message from the network device is not successfully received or the first message is not successfully decoded; and determine that the RRC statuses of the network device and the first terminal device are not aligned, where the first message is used to release or suspend a radio resource control RRC connection between the first terminal device and the network device.

Optionally, the first message is used to release the RRC connection between the first terminal device and the network device, and the first message indicates the first terminal device to enter the idle state; or the first message is used to suspend the RRC connection between the first terminal device and the network device, and the first message is used to configure the first terminal device to enter the inactive state.

Optionally, the first indication information comes from the network device.

Optionally, the first indication information is carried in an RRC message or a MAC CE sent by the network device to the second terminal device.

Optionally, the first indication information comes from the first terminal device.

Optionally, the paging message is used by the network device to page the first terminal device.

Optionally, the first indication information includes an identifier of the first terminal device. The processing unit 810 is specifically configured to listen, based on the identifier of the first terminal device, to the paging message sent by the network device for the first terminal device.

Optionally, the transceiver unit 830 is further configured to: receive the paging message sent by the network device for the first terminal device, and send the paging message to the first terminal device through the sidelink.

Optionally, the processing unit 810 is further configured to establish or reestablish the sidelink.

In some implementations, when the apparatus 800 is the first terminal device or a chip or a circuit disposed in the first terminal device, the transceiver unit 830 is configured to: receive second indication information from the second terminal device, and/or receive a paging message forwarded by the second terminal device, where the second indication information indicates the first terminal device to enter an idle state or an inactive state, and the paging message is used by the network device to page the first terminal device; and the processing unit 810 is configured to enter the idle state or the inactive state.

The first terminal device communicates with the network device by using the second terminal device, and the first terminal device communicates with the second terminal device through a sidelink.

Optionally, the transceiver unit 830 is further configured to receive third indication information from the second terminal device, and the third indication information indicates the first terminal device to release a sidelink configuration between the first terminal device and the second terminal device and/or an air-interface link configuration between the first terminal device and the network device.

Optionally, the processing unit 810 is further configured to establish or reestablish the sidelink.

Optionally, the processing unit 810 is specifically configured to initiate an RRC establishment or resumption process with the network device.

In some implementations, when the apparatus 800 is the network device or a chip or a circuit disposed in the network device, the transceiver unit 830 is configured to send a first message, where the first message is used to release or suspend a radio resource control RRC connection between the first terminal device and the network device; and the transceiver unit 830 is further configured to send first indication information to the second terminal device, where the first indication information indicates the second terminal device to listen to a paging message for the first terminal device.

The first terminal device communicates with the network device by using the second terminal device, and the first terminal device communicates with the second terminal device through a sidelink.

Optionally, the transceiver unit 830 is specifically configured to send the first message to the second terminal device.

Optionally, the first message is not successfully sent to the second terminal device, or the first message is not successfully decoded by the second terminal device.

Optionally, the transceiver unit 830 is further configured to receive negative feedback information. The negative feedback information indicates that the first message is not successfully sent to the second terminal device, or the first message is not successfully decoded by the second terminal device.

Optionally, the paging message is used by the network device to page the first terminal device.

Optionally, the first message is used to release the RRC connection between the first terminal device and the network device, and the first message is used to configure the first terminal device to enter an idle state; or the first message is used to suspend the RRC connection between the first terminal device and the network device, and the first message is used to configure the first terminal device to enter an inactive state.

Optionally, the first indication information includes an identifier of the first terminal device.

Optionally, the transceiver unit 830 is further configured to send a paging message or an RRC establishment message to the second terminal device.

Optionally, the first indication information is carried in an RRC message or a media access control control element MAC CE.

In some implementations, when the apparatus 800 is the second terminal device or a chip or a circuit disposed in the second terminal device, the processing unit 810 is configured to determine that no data or signaling of the first terminal device is received and/or sent within first duration; and the processing unit 810 is further configured to determine that the first terminal device enters an idle state or an inactive state.

The first terminal device communicates with the network device by using the second terminal device, and the first terminal device communicates with the second terminal device through a sidelink.

Optionally, the processing unit 810 is further configured to listen to a paging message sent by the network device for the first terminal device.

Optionally, the transceiver unit 830 is configured to send second indication information to the network device, where the second indication information indicates the first terminal device to enter the idle state or the inactive state.

Optionally, the transceiver unit 830 is configured to: receive downlink data and/or signaling from the network device, and forward the downlink data and/or signaling to the first terminal device.

Optionally, the processing unit 810 is specifically configured to: determine that a first timer expires, and determine that no data or signaling of the first terminal device is received or sent within the first duration.

Optionally, the transceiver unit 830 is configured to: receive or send the data or signaling of the first terminal device, and start or restart the first timer.

Optionally, the first duration is configured by the network device.

Optionally, the transceiver unit 830 is configured to: send fourth indication information to the first terminal device, where the fourth indication information indicates the first duration.

In some implementations, when the apparatus 800 is the first terminal device or a chip or a circuit disposed in the first terminal device, the processing unit 810 is configured to determine that no data or signaling is received from the network device within first duration, and/or no data or signaling is sent to the network device; and the processing unit 810 is further configured to determine that the first terminal device enters an idle state or an inactive state.

The first terminal device communicates with the network device by using a second terminal device, and the first terminal device communicates with the second terminal device through a sidelink.

Optionally, the transceiver unit 830 is configured to send second indication information to the second terminal device or the network device, where the second indication information indicates that the first terminal device is in the idle state or the inactive state.

Optionally, the transceiver unit 830 is configured to receive downlink data and/or signaling that are/is forwarded by the second terminal device and that are/is from the network device.

The processing unit 810 is further configured to initiate an RRC establishment or resumption process with the network device.

Optionally, the processing unit 810 is specifically configured to: when determining that a second timer expires, determine that no data or signaling from the network device is received within the first duration, and/or no data or signaling is sent to the network device.

Optionally, the transceiver unit 830 is configured to: receive the data or signaling from the network device, and/or send the data or signaling to the network device.

The processing unit 810 is further configured to start or restart the second timer.

Optionally, the transceiver unit 830 is further configured to receive the fourth indication information from the second terminal device, where the fourth indication information indicates the first duration.

In some implementations, when the apparatus 800 is the network device or a chip or a circuit disposed in the network device, the processing unit 810 is configured to determine that no data or signaling of the first terminal device is received and/or sent within first duration; and the processing unit 810 is further configured to determine that the first terminal device enters an idle state or an inactive state.

The first terminal device communicates with the network device by using the second terminal device, and the first terminal device communicates with the second terminal device through a sidelink.

Optionally, the transceiver unit 830 is configured to send first indication information to the second terminal device, where the first indication information indicates the second terminal device to listen to a paging message for the first terminal device.

Optionally, the transceiver unit 830 is configured to send second indication information to the second terminal device, where the second indication information indicates the first terminal device to enter the idle state or the inactive state.

Optionally, the processing unit 810 is specifically configured to: when determining that a third timer expires, determine that no data or signaling of the first terminal device is received or sent within the first duration.

Optionally, the processing unit 810 is specifically configured to start or restart the third timer at a moment of receiving or sending the data or signaling of the first terminal device.

Optionally, the processing unit 810 further determines the first duration.

Optionally, the transceiver unit 830 is further configured to: send fourth indication information to the second terminal device, where the fourth indication information indicates the first duration.

In some implementations, when the apparatus 800 is the second terminal device or a chip or a circuit disposed in the second terminal device, the transceiver unit 830 is configured to receive second indication information, where the second indication information indicates the first terminal device is in an idle state or an inactive state; and the processing unit 810 is configured to determine, based on the second indication information, that the first terminal device is in the idle state or the inactive state.

The first terminal device communicates with the network device by using the second terminal device, and the first terminal device communicates with the second terminal device through a sidelink.

Optionally, the second indication information comes from the first terminal device.

Optionally, the transceiver unit 830 is further configured to send the second indication information to the network device.

Optionally, the second indication information comes from the network device.

In some implementations, when the apparatus 800 is the network device or a chip or a circuit disposed in the network device, the transceiver unit 830 is configured to receive second indication information, where the second indication information indicates the first terminal device is in an idle state or an inactive state; and the network device determines, based on the second indication information, that the first terminal device is in the idle state or the inactive state.

The first terminal device communicates with the network device by using the second terminal device, and the first terminal device communicates with the second terminal device through a sidelink.

Optionally, the second indication information comes from the first terminal device or the second terminal device.

In some implementations, when the apparatus 800 is the first terminal device or a chip or a circuit disposed in the first terminal device, the transceiver unit 830 is configured to receive second indication information, where the second indication information indicates the first terminal device is in an idle state or an inactive state; and the processing unit 810 is configured to enter the idle state or the inactive state.

The first terminal device communicates with the network device by using the second terminal device, and the first terminal device communicates with the second terminal device through a sidelink.

Optionally, the second indication information comes from the second terminal device or the network device.

The units in the foregoing embodiments may also be referred to as modules, circuits, or components.

Functions and actions of the modules or units in the apparatus 800 listed above are merely examples for description. When the apparatus 800 is configured in or is the network device, the modules or the units in the apparatus 800 may be configured to perform the actions or processing processes performed by the network device in the foregoing method embodiments. When the apparatus 800 is configured in or is the first terminal device, the modules or units in the apparatus 800 may be configured to perform the actions or processing processes performed by the first terminal device in the foregoing method embodiments. When the apparatus 800 is configured in or is the second terminal device, the modules or units in the apparatus 800 may be configured to perform the actions or processing processes performed by the second terminal device in the foregoing method embodiments.

For concepts, explanations, detailed description, and other steps of the apparatus 800 that are related to the technical solutions provided in embodiments of this application, refer to the description of the content in the foregoing methods or other embodiments. Details are not described herein again.

Figure 9:
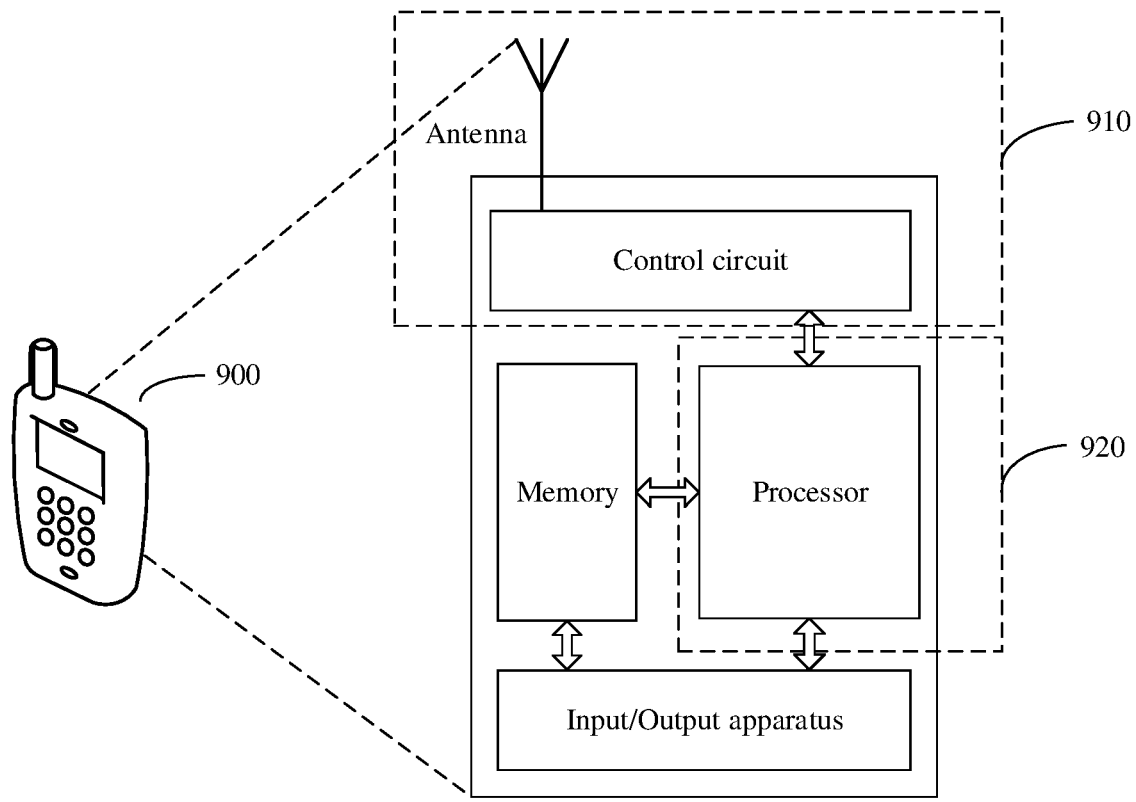
FIG. 9 is a schematic diagram of a structure of a terminal device according to this application.

FIG. 9 is a schematic diagram of a structure of a terminal device 900 according to this application. The terminal device 900 may perform the actions performed by the terminal device (for example, the first terminal device or the second terminal device) in the foregoing method embodiments.

For ease of description, FIG. 9 only shows main components of the terminal device. As shown in FIG. 9, the terminal device 900 includes a processor, a memory, a control circuit, an antenna, and an input/output apparatus.

The processor is mainly configured to: process a communications protocol and communications data, control the entire terminal device, execute a software program, and process data of the software program, for example, is configured to support the terminal device to perform the actions described in the foregoing embodiments of the indication method for transmitting a precoding matrix. The memory is mainly configured to: store the software program and the data, for example, store a codebook described in the foregoing embodiment. The control circuit is mainly configured to: perform conversion between a baseband signal and a radio frequency signal, and process the radio frequency signal. A combination of the control circuit and the antenna may also be referred to as a transceiver, mainly configured to send or receive a radio frequency signal in an electromagnetic wave form. The input/output apparatus, for example, a touchscreen, a display, a keyboard, or the like is mainly configured to: receive data input by a user, and output data to the user.

After the terminal device is powered on, the processor may read the software program in a storage unit, interpret and execute instructions of the software program, and process the data of the software program. When data needs to be wirelessly sent, after performing baseband processing on the to-be-sent data, the processor outputs a baseband signal to a radio frequency circuit. After performing radio frequency processing on the baseband signal, the radio frequency circuit sends a radio frequency signal in the electromagnetic wave form through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 9 shows only one memory and only one processor. An actual terminal device may include a plurality of processors and memories. The memory may also be referred to as a storage medium, a storage device, or the like. This is not limited in this embodiment of this application.

For example, the processor may include a baseband processor and a central processing unit. The baseband processor is mainly configured to process the communications protocol and the communications data. The central processing unit is mainly configured to: control the entire terminal device, execute the software program, and process the data of the software program. The processor in FIG. 9 integrates functions of the baseband processor and the central processing unit. A person skilled in the art may understand that the baseband processor and the central processing unit may alternatively be independent processors, and are interconnected by using a technology such as a bus. A person skilled in the art may understand that the terminal device may include a plurality of baseband processors to adapt to different network standards, and the terminal device may include a plurality of central processing units to enhance processing capabilities of the terminal device, and components of the terminal device may be connected through various buses. The baseband processor may also be expressed as a baseband processing circuit or a baseband processing chip. The central processing unit may alternatively be expressed as a central processing circuit or a central processing chip. A function of processing the communications protocol and the communications data may be embedded in the processor, or may be stored in the storage unit in a form of the software program. The processor executes the software program to implement a baseband processing function.

For example, in this embodiment of this application, the antenna and the control circuit that have sending and receiving functions may be considered as a transceiver unit 910 of the terminal device 900, and the processor having a processing function may be considered as a processing unit 920 of the terminal device 900. As shown in FIG. 9, the terminal device 900 includes the transceiver unit 910 and the processing unit 920. The transceiver unit 910 may also be referred to as a transceiver, a transceiver machine, a transceiver apparatus, or the like. Optionally, a component that is in the transceiver unit 910 and that is configured to implement a receiving function may be considered as a receiving unit, and a component that is in the transceiver unit 910 and that is configured to implement a sending function may be considered as a sending unit. In other words, the transceiver unit includes the receiving unit and the sending unit. For example, the receiving unit may also be referred to as a receiver machine, a receiver, a receiver circuit, or the like. The sending unit may be referred to as a transmitter machine, a transmitter, a transmitter circuit, or the like.

Figure 10:
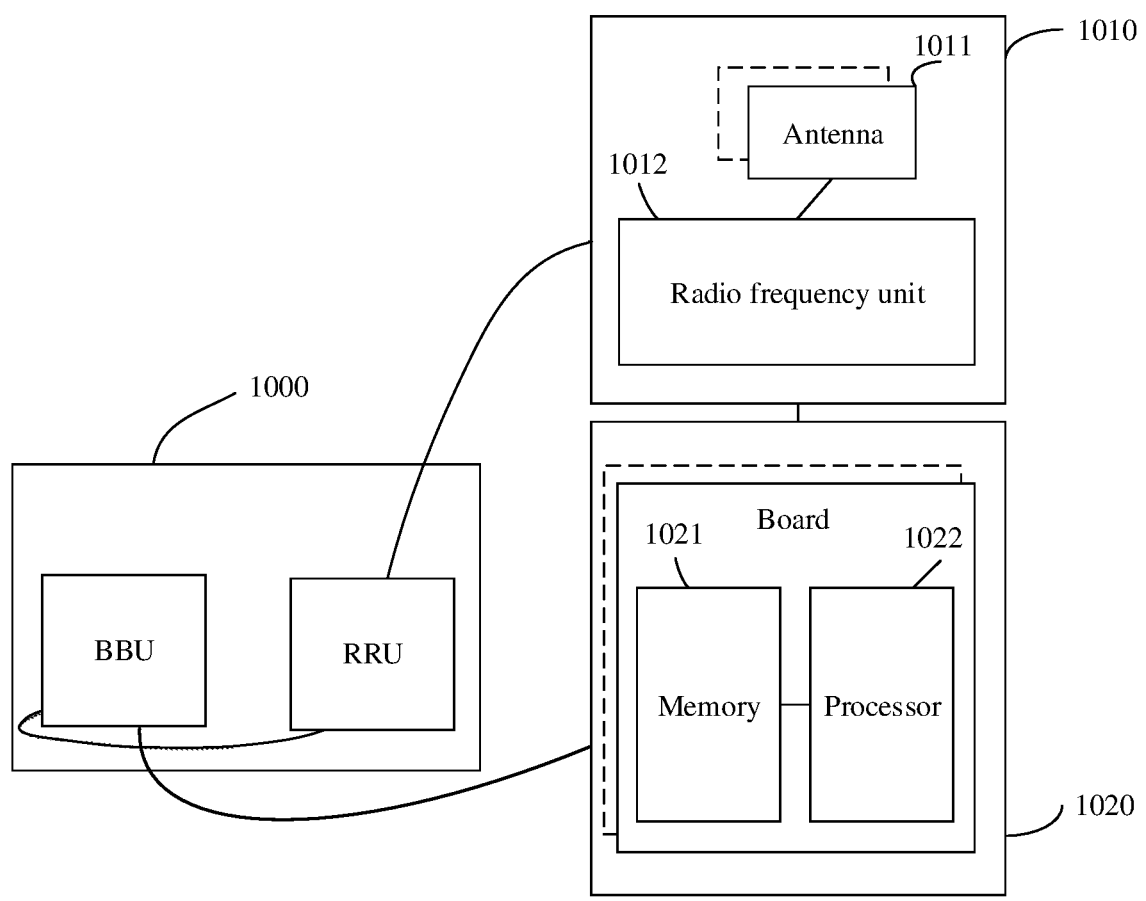
FIG. 10 is a schematic diagram of a structure of a network device according to an embodiment of this application.

FIG. 10 is a schematic diagram of a structure of a network device 1000 according to an embodiment of this application. The network device may be configured to implement the function of the network device in the foregoing method. The network device 1000 includes one or more radio frequency units such as a remote radio unit (RRU) 1010 and one or more baseband units (BBU) (which may also be referred to as a digital unit, digital unit, DU) 1020. The RRU 1010 may be referred to as a transceiver unit, a transceiver machine, a transceiver circuit, a transceiver, or the like, and may include at least one antenna 1011 and a radio frequency unit 1012. The RRU 1010 is mainly configured to: send and receive a radio frequency signal and perform conversion between a radio frequency signal and a baseband signal, for example, configured to send the signaling message in the foregoing embodiments to a terminal device. The BBU 1020 is mainly configured to: perform baseband processing, control a base station, and the like. The RRU 1010 and the BBU 1020 may be physically disposed together, or may be physically disposed separately, that is, distributed base stations.

The BBU 1020 is a control center of the base station, may also be referred to as a processing unit, and is mainly configured to implement a baseband processing function, for example, channel coding, multiplexing, modulation, and spectrum spreading. For example, the BBU (the processing unit) 1020 may be configured to control the network device to perform an operation procedure related to the network device in the foregoing method embodiments.

In an example, the BBU 1020 may include one or more boards, and a plurality of boards may jointly support a radio access network (such as an LTE system or a 5G system) of a single access standard, or may respectively support radio access networks of different access standards. The BBU 1020 further includes a memory 1021 and a processor 1022. The memory 1021 is configured to store necessary instructions and data. The processor 1022 is configured to control the network device to perform a necessary action, for example, is configured to control the network device to perform an operation procedure related to the network device in the foregoing method embodiments. The memory 1021 and the processor 1022 may serve the one or more boards. In other words, the memory and processor can be separately set on each board. Alternatively, a plurality of boards may share a same memory and a same processor. In addition, a necessary circuit may be further disposed on each board.

In a possible implementation, with development of a system-on-a-chip (SoC) technology, all or some functions of the BBU 1020 and the RRU 1010 may be implemented by using the SoC technology, for example, implemented by using a base station function chip. The base station function chip integrates components such as a processor, a memory, and an antenna interface. A program of a base station-related function is stored in the memory. The processor executes the program to implement the base station-related function. Optionally, the base station function chip can also read an external memory of the chip to implement the base station-related function.

It should be understood that the structure of the network device shown in FIG. 1 is merely a possible form, and should not constitute any limitation on this embodiment of this application. This application does not exclude a possibility that a base station structure of another form may appear in the future.

According to the method provided in this embodiment of this application, an embodiment of this application further provides a communications system, including the foregoing network device, first terminal device, and second terminal device.

It should be understood that in this embodiment of this application, the processor may be a central processing unit (CPU). The processor may alternatively be a general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It may be understood that the memory in embodiments of this application may be a volatile memory or a non-volatile memory, or may include a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) that is used as an external cache. By way of example but not limitation, random access memories (RAM) in a plurality of forms may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented using software, hardware, firmware, or any combination thereof. When software is used to implement embodiments, the foregoing embodiments may be implemented completely or partially in a form of a computer program product. The computer program product includes one or more computer instructions or computer programs. When the program instructions or the computer programs are loaded and executed on the computer, the procedures or functions according to embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid state disk.

An embodiment of this application further provides a computer-readable medium that stores a computer program. When the computer program is executed by a computer, the steps performed by the network device, the steps performed by the first terminal device, or the steps performed by the second terminal device in any one of the foregoing embodiments are implemented.

An embodiment of this application further provides a computer program product. When the computer program product is executed by a computer, the steps performed by the network device, the steps performed by the first terminal device, or the steps performed by the second terminal device in any one of the foregoing embodiments are implemented.

An embodiment of this application further provides a system chip. The system chip includes: a communications unit and a processing unit. The processing unit may be, for example, a processor. The communications unit may be, for example, an input/output interface, a pin, or a circuit. The processing unit may execute computer instructions, so that a chip in a communications apparatus performs the steps performed by the network device, the steps performed by the first terminal device, or the steps performed by the second terminal device provided in the foregoing embodiments of this application.

Optionally, the computer instructions are stored in a storage unit.

An embodiment of this application further provides a communications system, including the network device, the first terminal device, and the second terminal device in the foregoing embodiments.

Embodiments in this application may be used independently, or may be used jointly. This is not limited herein.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, a computer-readable medium may include but is not limited to: a magnetic storage component (for example, a hard disk, a floppy disk, or a magnetic tape), an optical disc (for example, a compact disc (CD), a digital versatile disc (DVD), or the like), and a smart card and a flash memory component (for example, an erasable programmable read-only memory (EPROM), a card, a stick, a key drive, or the like). In addition, various storage media described in this specification may indicate one or more devices and/or other machine-readable media that are configured to store information. The term "machine-readable media" may include but is not limited to a wireless channel, and various other media that can store, include, and/or carry instructions and/or data.

It should be noted that in embodiments provided in this application, there is no time limitation relationship between the steps. Each step may be used as a solution, or may be combined with one or more other steps to form a solution. This is not limited in this application.

Embodiments in this application may be used independently, or may be used jointly. For example, any one or more steps in the different embodiments may be combined to form a separate embodiment. This is not limited herein.

It should be understood that in the foregoing embodiments, terms such as first and second are merely intended to distinguish different objects, and should not constitute any limitation on this application.

It should be understood that sequence numbers of the foregoing processes do not mean execution sequences in embodiments of this application. The execution sequences of the processes should be determined based on functions and internal logic of the processes, and should not be construed as any limitation on the implementation processes of embodiments of this application.

It should be further understood that the term "and/or" describes an association relationship between associated objects and represents that three relationships may exist. For example, A and/or B may represent the following three cases: Only A exists, both A and B exist, and only B exists. The character "/" generally indicates an "or" relationship between the associated objects. The term "at least one" means one or more. The term "at least one of A and B", similar to the term "A and/or B", describes an association relationship between the associated objects and represents that three relationships may exist. For example, at least one of A and B may represent the following three cases: Only A exists, both A and B exist, and only B exists.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed systems, apparatuses, and methods may be implemented in other manners. For example, the described apparatus embodiments are merely examples. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium, for example, a USB flash drive, a removable hard disk, a read-only memory (ROM), a random access memory (RAM), a magnetic disk, an optical disc, or the like that can store program code.

The foregoing description is merely a specific implementation of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communications method, applied to a second terminal device, comprising:
    receiving first indication information, wherein the first indication information indicates to the second terminal device to listen to a paging message for a first terminal device;
    listening to the paging message sent by a network device for the first terminal device; and
    sending second indication information to the first terminal device, wherein the second indication information indicates to the first terminal device to enter an idle state or an inactive state,
    wherein the first terminal device communicates with the network device using the second terminal device, and the first terminal device communicates with the second terminal device through a sidelink.

2. The method according to claim 1, further comprising:
    sending third indication information to the first terminal device, wherein the third indication information indicates to the first terminal device to release at least one of a sidelink configuration between the first terminal device and the second terminal device or an air-interface link configuration between the first terminal device and the network device.

3. The method according to claim 1, further comprising:
    determining that radio resource control (RRC) statuses of the network device and the first terminal device are not aligned.

4. The method according to claim 3, wherein the determining that RRC statuses of the network device and the first terminal device are not aligned comprises:
    determining, based on determining that a first message from the network device fails to be received or the first message fails to be decoded, that the RRC statuses of the network device and the first terminal device are not aligned, wherein the first message indicates to release or suspend a RRC connection between the first terminal device and the network device.

5. The method according to claim 4, wherein one of:
    the first message indicates to release the RRC connection between the first terminal device and the network device, and the first message indicates the first terminal device to enter an idle state; or
    the first message indicates to suspend the RRC connection between the first terminal device and the network device, and the first message indicates a configuration for the first terminal device to enter an inactive state.

6. The method according to claim 3, wherein the first indication information comes from the network device.

7. The method according to claim 1, wherein the first indication information comes from the first terminal device.

8. The method according to claim 1, wherein the first indication information comprises an identifier of the first terminal device, and wherein the listening to the paging message sent by the network device for the first terminal device comprises:
    listening, based on the identifier of the first terminal device, to the paging message sent by the network device for the first terminal device.

9. A communications method, applied to a first terminal device, comprising:
    receiving a second indication information from a second terminal device and a paging message forwarded by the second terminal device, wherein the second indication information indicates to the first terminal device to enter an idle state or an inactive state, and wherein the paging message indicates a page from a network device to the first terminal device; and
    entering the idle state or the inactive state,
    wherein the first terminal device communicates with the network device using the second terminal device, and the first terminal device communicates with the second terminal device through a sidelink.

10. The method according to claim 9, further comprising:
receiving third indication information from the second terminal device, wherein the third indication information indicates the first terminal device to release at least one of a sidelink configuration between the first terminal device and the second terminal device or an air-interface link configuration between the first terminal device and the network device.

11. The method according to claim 9, wherein the method further comprises performing, before the receiving at least one of the second indication information from the second terminal device, or the paging message forwarded by the second terminal device and that is from a network device:
establishing or reestablishing the sidelink.

12. The method according to claim 9, wherein the entering the idle state or the inactive state further comprises, based on receiving the paging message that is forwarded by the second terminal device and that is from the network device,
initiating an RRC establishment or resumption process with the network device.

13. A communications method, comprising:
sending a first message, wherein the first message indicates that a first terminal device is to release or suspend a radio resource control (RRC) connection between the first terminal device and a network device; and
sending first indication information to a second terminal device, wherein the first indication information indicates the second terminal device to listen to a paging message for the first terminal device,
wherein the first terminal device communicates with the network device using the second terminal device, and the first terminal device communicates with the second terminal device through a sidelink.

14. The method according to claim 13, wherein the sending the first message comprises:
sending the first message to the second terminal device.

15. The method according to claim 14, further comprising:
receiving negative feedback information, wherein the negative feedback information indicates that the first message is not successfully sent to the second terminal device, or that the first message is not successfully decoded by the second terminal device.

16. The method according to claim 13, wherein when the first message indicates to release the RRC connection between the first terminal device and the network device, the first message indicates a configuration for the first terminal device to enter an idle state; and
when the first message indicates to suspend the RRC connection between the first terminal device and the network device, the first message indicates a configuration for the first terminal device to enter an inactive state.

17. The method according to claim 13, wherein the first indication information comprises an identifier of the first terminal device.

18. The method according to claim 13, wherein the method further comprises performing, before the sending first indication information to the second terminal device:
sending a paging message or an RRC establishment message to the second terminal device.

19. The method according to claim 13, wherein the first indication information is carried in an RRC message or a media access control control element (MAC CE).

* * * * *